United States Patent
Yajima et al.

(10) Patent No.: US 9,679,052 B2
(45) Date of Patent: Jun. 13, 2017

(54) PORTABLE ELECTRONIC DEVICE, SIGNAL PROCESSING METHOD AND PLAYBACK METHOD

(75) Inventors: Masakazu Yajima, Kanagawa (JP); Takeshi Yamagishi, Kanagawa (JP); Takeshi Itagaki, Saitama (JP); Hideaki Ishioka, Tokyo (JP); Katsuhiko Nakano, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/234,091

(22) PCT Filed: Jul. 11, 2012

(86) PCT No.: PCT/JP2012/068259
§ 371 (c)(1),
(2), (4) Date: Jan. 29, 2014

(87) PCT Pub. No.: WO2013/015179
PCT Pub. Date: Jan. 31, 2013

(65) Prior Publication Data
US 2014/0163708 A1    Jun. 12, 2014

(30) Foreign Application Priority Data
Jul. 25, 2011 (JP) .................... 2011-162515

(51) Int. Cl.
*G06F 17/00* (2006.01)
*G06F 17/30* (2006.01)
(Continued)

(52) U.S. Cl.
CPC ........ *G06F 17/3074* (2013.01); *A43B 3/0005* (2013.01); *A43B 3/0021* (2013.01);
(Continued)

(58) Field of Classification Search
CPC ................ A43B 3/0005; A43B 3/0021; H04R 2201/023
(Continued)

(56) References Cited

U.S. PATENT DOCUMENTS 3,696,258 A * 10/1972 Anderson ................ G04C 3/16
310/10
3,927,354 A * 12/1975 Bauser .................... F23Q 2/285
29/592.1
(Continued)

FOREIGN PATENT DOCUMENTS

CN    1618400    5/2005
JP    63028280 A  * 2/1988
(Continued)

OTHER PUBLICATIONS

Office Action issued in connection with Chinese Patent Application No. 201280035560.X, dated May 5, 2015. (6 pages).
(Continued)

*Primary Examiner* — Joseph Saunders, Jr.
(74) *Attorney, Agent, or Firm* — K&L Gates LLP

(57) ABSTRACT

Provided is a portable electronic device including a signal processing unit, a controller that supplies a control signal to the signal processing unit, and a power generation unit that generates an electrical signal as power and supplies the generated electrical signal to the signal processing unit.

14 Claims, 22 Drawing Sheets

(51) Int. Cl.
  *G11B 20/10* (2006.01)
  *A43B 3/00* (2006.01)
  *H02J 7/32* (2006.01)
  *H04R 1/02* (2006.01)
  *H04R 5/02* (2006.01)

(52) U.S. Cl.
  CPC ............. *G11B 20/10* (2013.01); *H02J 7/32* (2013.01); *H04R 1/028* (2013.01); *H04R 5/02* (2013.01); *H04R 2201/023* (2013.01); *H04R 2201/028* (2013.01)

(58) Field of Classification Search
  USPC .......................................................... 700/94
  See application file for complete search history.

(56) References Cited

U.S. PATENT DOCUMENTS

| | | | |
|---|---|---|---|
| 2005/0093301 A1* | 5/2005 | Chiu | A43B 3/00 290/1 R |
| 2005/0126370 A1* | 6/2005 | Takai | A63B 24/0003 84/636 |
| 2007/0205693 A1* | 9/2007 | Takiguchi | 310/314 |
| 2009/0235811 A1 | 9/2009 | Komori et al. | |

FOREIGN PATENT DOCUMENTS

| | | | |
|---|---|---|---|
| JP | 02219478 A | * | 9/1990 |
| JP | 2001-327197 | | 11/2001 |
| JP | 2003-283609 | | 10/2003 |
| JP | 2005-156641 | | 6/2005 |
| JP | 2005235343 A | * | 9/2005 |
| JP | 2005-293505 | | 10/2005 |
| JP | 2006-079782 | | 3/2006 |
| JP | 2007-188574 | | 7/2007 |
| JP | 2007-189649 A | | 7/2007 |
| JP | 2007-298598 | | 11/2007 |
| JP | 2009-277280 | | 11/2009 |
| JP | 2001-327197 | | 11/2011 |

OTHER PUBLICATIONS

Office Action issued in connection with Japanese Patent Application No. 2011162515 dated Aug. 18, 2015. (4 pages).
Office Action issued in connection with Chinese Patent Application No. 201280035560.X dated Dec. 28, 2015. (6 pages).
Office Action issued in JP application 2011162515, mailed Feb. 9, 2016, 4 pages.
Japanese Office Action issued Apr. 11, 2017 in corresponding Japanese application No. 2016-192267 (6 pages).

* cited by examiner

FIG. 5
A
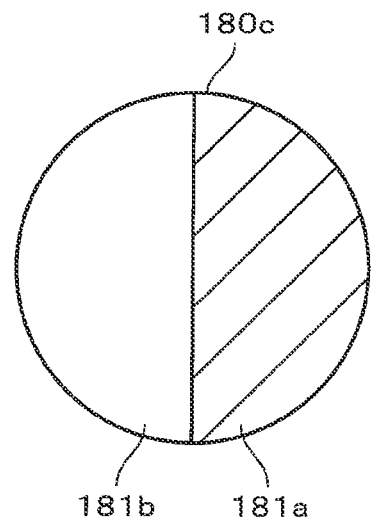
B
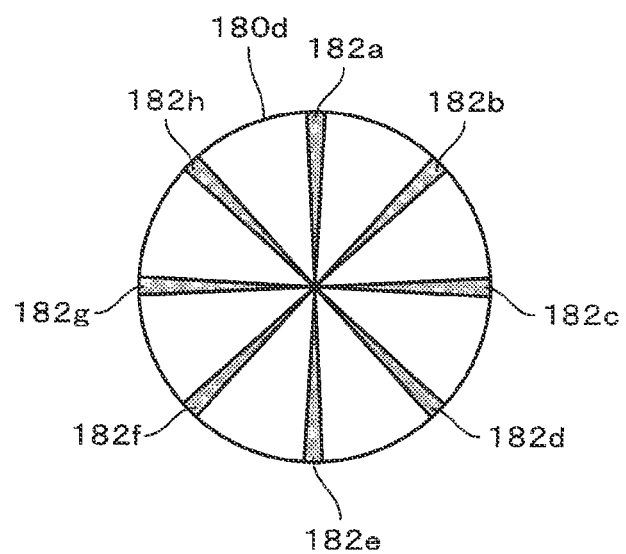

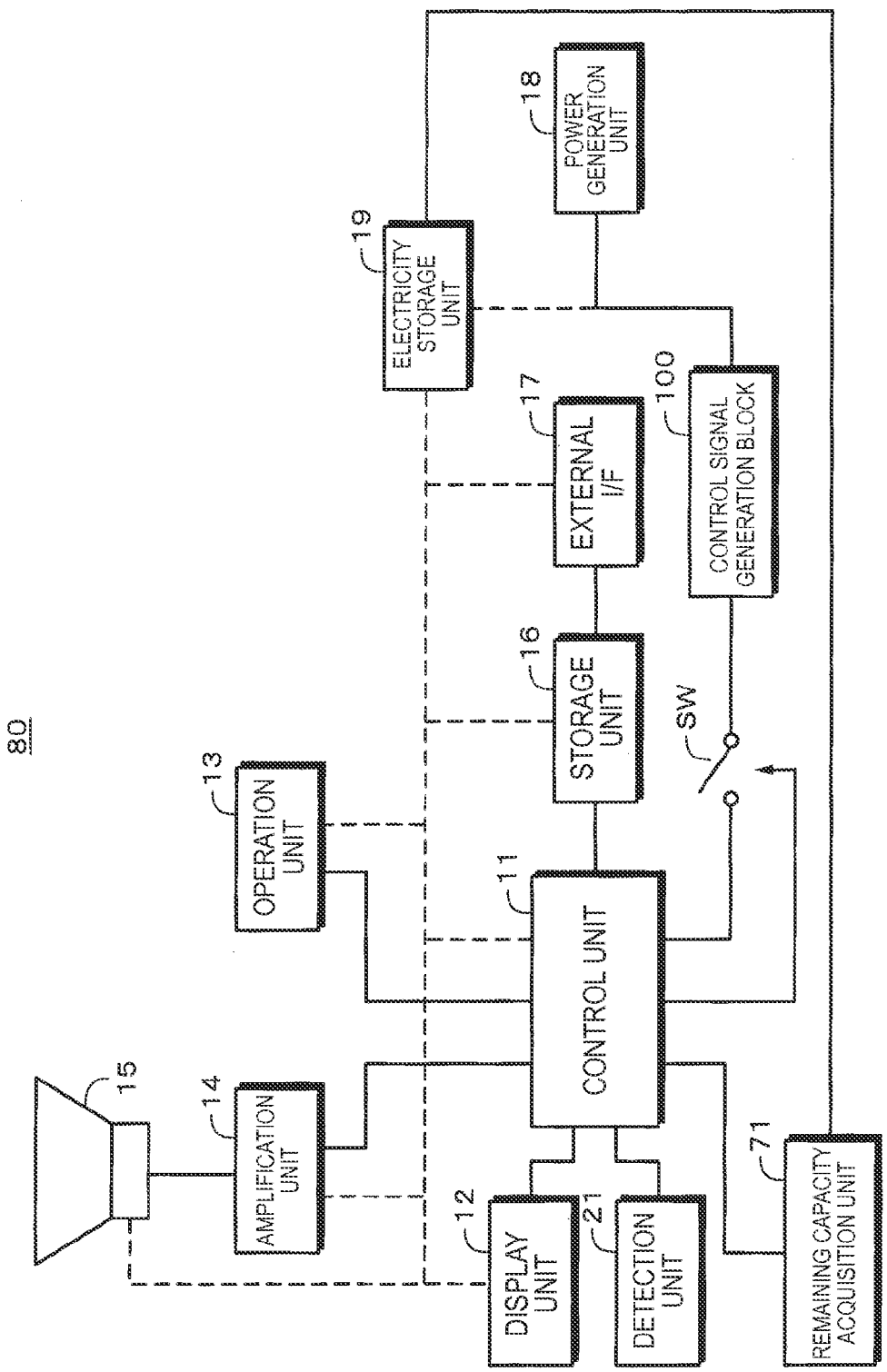

PORTABLE ELECTRONIC DEVICE, SIGNAL PROCESSING METHOD AND PLAYBACK METHOD

CROSS REFERENCES TO RELATED APPLICATIONS

The present application is a national stage of International Application No. PCT/JP2012/068259 filed on Jul. 11, 2012 and claims priority to Japanese Patent Application No. 2011-162515 filed on Jul. 25, 2011, the disclosure of which is incorporated herein by reference.

BACKGROUND

The present disclosure relates to a portable electronic device to be not charged, a signal processing method and a playback method, for example.

Recently, portable electronic devices which are used outside by the user such as a mobile phone and a portable music player are widely prevalent. As described in Patent Literature 1, it is general that such a portable electronic device has a secondary battery which can be charged and discharged as a power source.

CITATION LIST

Patent Literature

Patent Literature 1: JP 2003-283609A

SUMMARY

Technical Problem

In the portable electronic device described in Patent Literature 1, in a case where the remaining capacity of the secondary battery is insufficient, it is demanded to charge the secondary battery by the use of a commercial power source. Therefore, in a case where the battery remaining capacity becomes insufficient in a place without the commercial power source such as the outdoors, there is a problem that it is forced to stop the use of the portable electronic device. In addition, since the secondary battery is discharged in a case where the portable electronic device is not used for a long time, there is a problem that it is not possible to immediately use the portable electronic device.

Therefore, one of objects of the present disclosure is to provide a portable electronic device to be not charged, a signal processing method and a playback method, for example.

Solution to Problem

According to an embodiment of the present disclosure, there is provided a portable electronic device including a signal processing unit, a controller that supplies a control signal to the signal processing unit, and a power generation unit that generates an electrical signal as power and supplies the generated electrical signal to the signal processing unit.

According to an embodiment of the present disclosure, there is provided a portable electronic device including a signal processing unit that performs processing to play content, and a power generation unit that generates an electrical signal as power and supplies the electrical signal to an electricity storage unit. The signal processing unit changes a playback mode of the content according to a remaining capacity of the electricity storage unit.

According to an embodiment of the present disclosure, there is provided a signal processing method in a portable electronic device including a signal processing unit, a controller and a power generation unit, the signal processing method including supplying a control signal to the signal processing unit, the control signal being output from the controller, and supplying an electrical signal generated by the power generation unit as power to the signal processing unit.

According to an embodiment of the present disclosure, there is provided a playback method including playing content by a signal processing unit, generating an electrical signal as power by a power generation unit and supplying the electrical signal to an electricity storage unit, and changing a playback mode of the content according to a remaining capacity of the electricity storage unit.

Advantageous Effects of Invention

According to at least one embodiment, it is possible to generate electric power in a portable electronic device and it is not demanded to charge the portable Additional features and advantages are described herein, and will be apparent from the following Detailed Description and the figures. electronic by the use of an external power source such as a commercial power source.

BRIEF DESCRIPTION OF THE FIGURES

FIG. 5A is a schematic diagrammatic view to describe one example of the facing surface of an electret rotor and FIG. 5B is a schematic diagrammatic view to describe one example of the facing surface of an electret stator.

FIG. 22 is a block diagram illustrating one example of a configuration of a portable music player in the eighth embodiment.

DETAILED DESCRIPTION

Figure 1:
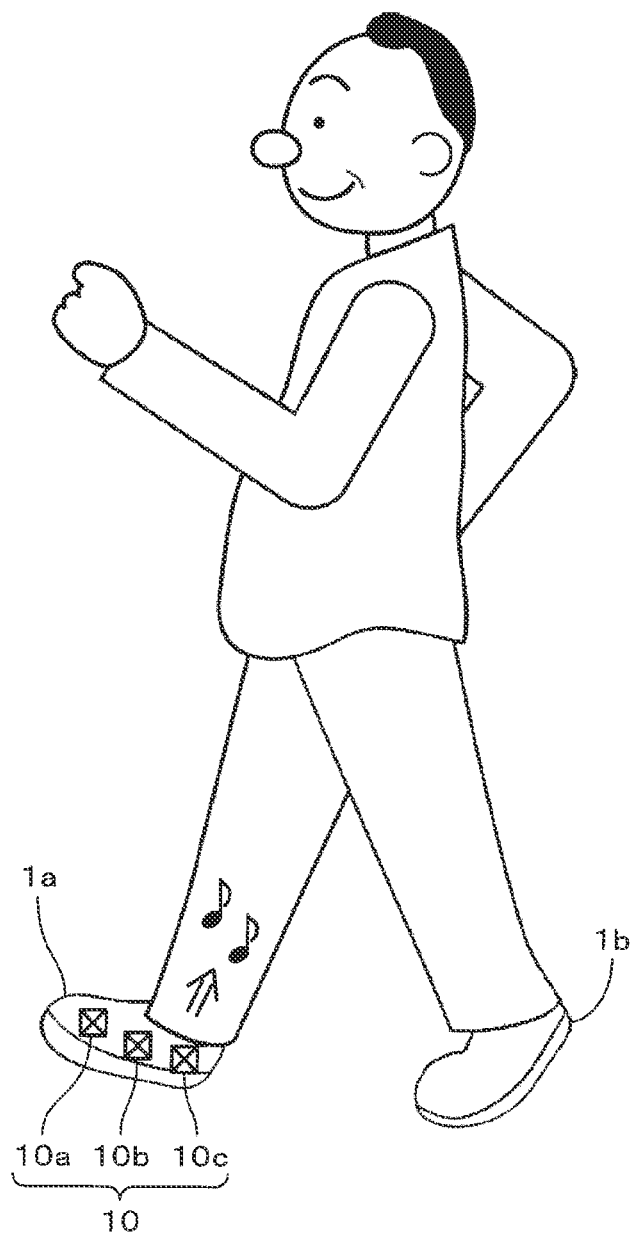
FIG. 1 is a schematic diagrammatic view illustrating the outline of the first embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In the following, a plurality of embodiments of the present disclosure are described. Moreover, the explanation is given in the following order.
<1. First embodiment>
<2. Second embodiment>
<3. Third embodiment>
<4. Fourth embodiment>
<5. Fifth embodiment>
<6. Sixth embodiment>
<7. Seventh embodiment>
<8. Eighth embodiment>
<9. Variation example>

In each embodiment described below, the same components are denoted with the same reference numerals. The components to which the same reference numerals are assigned have the same function unless otherwise specified in each embodiment, and overlapping explanation is adequately omitted.

Moreover, the present disclosure is not limited to the embodiments and the variation example explained below. All or part of each embodiment can be mutually combined as long as technical contradiction is not caused.

1. First Embodiment

Outline of the First Embodiment

In a plurality of embodiments described below, an explanation is given using a portable music player as one example of a portable electronic device. The present disclosure is applicable to the portable music player in addition to other portable electronic devices such as a mobile phone, a digital still camera, a portable personal computer and a smart phone.

FIG. 1 shows the outline of the first embodiment. It is assumed that the user wears shoes 1 formed with shoes 1a and 1b and walks or runs (hereinafter, arbitrarily referred to as "walking or the like"). As the shoes 1, it is possible to apply footwear such as sports shoes, boots, high-heeled shoes, business shoes and sandals.

In the first embodiment, a portable music player 10 is incorporated in the shoe 1a, and the portable music player 10 and the shoe 1a are integrally formed. The portable music player 10 and the shoe 1b may be integrally formed. The portable music player 10 may be incorporated in both of the shoes 1a and 1b.

The portable music player 10 adopts a configuration including, for example, a signal processing unit and controller 10a, a power generation unit 10b and a super-directional speaker 10c. The signal processing unit and controller 10a and the power generation unit 10b are built into the shoe 1a and the super-directional speaker 10c is attached to the surface of the shoe 1a.

For example, the signal processing unit performs playback processing to play music content according to a control signal from the controller. The music content subjected to the playback processing is played from the super-directional speaker 10c. The super-directional speaker 10c has directional characteristics to play the music content near the ears of the user who is wearing the shoes 1. Therefore, the music content played from the super-directional speaker 10c is not diffused to the surroundings and only the user who is wearing the shoes 1 can listen to the played music content.

For example, the power generation unit 10b generates an electrical signal (which may be simply abbreviated to "power" or "electrical signal" below) as power according to an action to move the feet up and down, which is caused by walking or the like using the shoes 1. That is, the power generation unit 10b generates the power according to an action to put the feet on the ground and an action to lift the put feet. An action including the action to put the feet and the action to lift the feet is adequately referred to as "stepping action." The power generated by the power generation unit 10b is supplied to each unit of the portable music player 10. Each unit of the portable music player 10 is operated by the power supplied from the power generation unit 10b. Since the portable music player 10 has the power generation unit 10b, it is not demanded to supply power from an external power source to the portable music player 10. In addition, it is not demanded to charge the portable music player 10 by the use of the external power source.

"Configuration of Portable Music Player"

Figure 2:
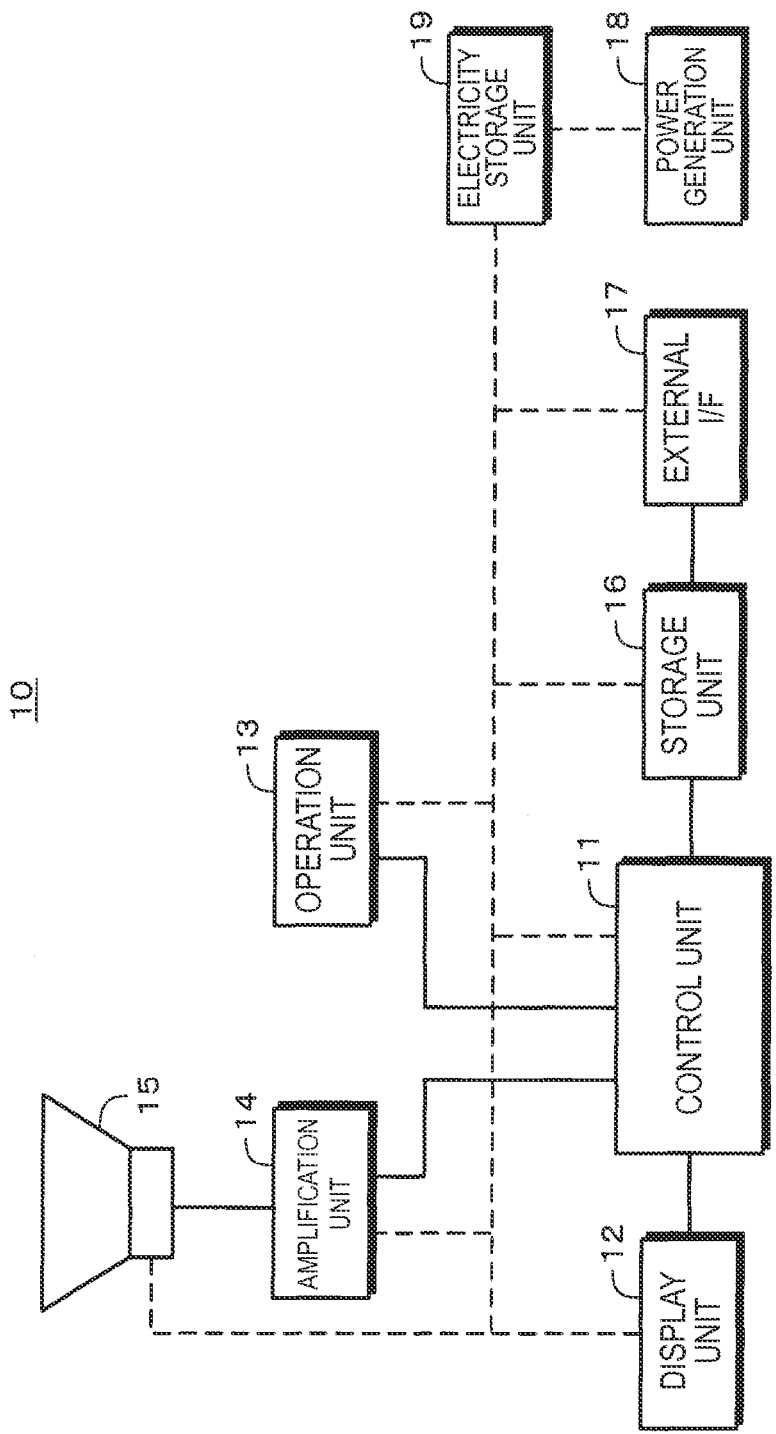
FIG. 2 is a block diagram illustrating one example of a configuration of a portable music player in the first embodiment.

FIG. 2 illustrates one example of a configuration of the portable music player 10. The portable music player 10 includes a control unit 11 as one example of a signal processing unit. For example, the control unit 11 is formed with a CPU (Central Processing Unit) and DSP (Digital Signal Processor), and so on. A display unit 12, operation unit 13, an amplification unit 14 and a storage unit 16 are connected to the control unit 11. A speaker 15 corresponding to the super-directional speaker 10c described above is connected to the amplification unit 14. An external I/F (Interface) 17 is connected to the storage unit 16.

The portable music player 10 includes a power generation unit 18 corresponding to the power generation unit 10b. For example, the power generation unit 18 generates power according to the stepping action. The power generated by the power generation unit 18 is supplied to an electricity storage unit 19 and the electricity storage unit 19 is charged. The power is supplied from the electricity storage unit 19 to each unit of the portable music player 10. In the figure, one example of a power supply line is illustrated by a dotted line. For example, the power is supplied from the electricity storage unit 19 to the control unit 11. The power may be supplied from the electricity storage unit 19 to other compositions such as the display unit 12 and the operation unit 13. Here, the power generated by the power generation unit 18 may be directly supplied to the control unit 11 or the like without passing through the electricity storage unit 19.

Each unit of the portable music player 10 is described in detail. For example, the control unit 11 performs processing according to a control signal. For example, the control unit 11 reads out stored music content data subjected to compression coding from a storage unit 16 and performs playback processing including decoding processing and error correction processing on the read music content data. The music content data subjected to the playback processing is supplied from the control unit 11 to the amplification unit 14. In addition, for example, the control unit 11 may generate a display control signal based on the playback state of the music content and supply the generated display control signal to the display unit 12. The display unit 12 performs display based on the display control signal.

The control signal is supplied from the operation unit 13 to the control unit 11. The control signal is, for example, a signal having, as content, an instruction to play or stop music content and an instruction to change the playback order of the music content. The control unit 11 performs processing according to the control signal supplied from the operation unit 13.

The display unit 12 is formed with an LCD (Liquid Crystal Display) or an organic EL (Electroluminescence), and so on, and displays content based on the display control signal supplied from the control unit 11. For example, the display unit 12 displays the playback elapsed time of music content and the title of the currently played music content. Here, the display unit 12 may be installed in the shoe 1a and may be separated from the portable music player 10. For example, it is assumed that the display unit 12 is attachable to the user's arm like a wristwatch and transmits a display control signal to the display unit 12 by radio. The display unit 12 may be caused to perform display based on the transmitted display control signal.

The operation unit 13 that is one example of a controller includes, for example, a button to play or stop the playback of music content and a switch to turn on/off the supply of power from the electricity storage unit 19. A control signal is generated based on operation of these buttons or the like and the generated control signal is supplied to the control unit 11.

For example, the operation unit 13 is attached to the surface of the shoe 1a. The operation unit 13 may be formed as a remote-control apparatus that can be operated in the user's hand and a control signal may be transmitted from the operation unit 13 to the control unit 11 by radio. For example, in a case where the operation unit 13 is installed in the surface of the shoe 1a, the operation unit 13 is operated at the time of an action to wear the shoe 1a, and, for example, it is possible to instruct the playback of music content. The operation unit 13 and the display unit 12 may be integrally formed and the operation unit 13 may be formed as a touch panel.

The amplification unit 14 amplifies the music content data supplied from the control unit 11 at a predetermined amplification factor. The music content data amplified by the amplification unit 14 is supplied to the speaker 15 and the music content is played from the speaker 15. The speaker 15 has a directivity that emits the music content toward the vicinity of the user's ears. Therefore, the music content played from the speaker 15 is played only for the user who is wearing the shoes 1.

The storage unit 16 is, for example, a nonvolatile memory including a semiconductor memory. The storage unit 16 may also be a hard disk. The storage unit 16 may be detachable to the portable music player 10 like an optical disc or a USB (Universal Serial Bus) memory. For example, a plurality items of music content data subjected to compression coding in the MP3 (MPEG Audio Layer 3) scheme are stored in the storage unit 16.

The external I/F 17 is connected to the storage unit 16. The music content data can be retrieved in the portable music player 10 from a personal computer or a distribution server connected to a network, through the external I/F 17. The retrieved music content data is stored in the storage unit 16. The music content data retrieved through the external I/F 17 may be directly supplied to the control unit 11 without via the storage unit 16. The supplied music content data may be subjected to playback processing (streaming playback) by the control unit 11.

The power generation unit 18 generates power according to a predetermined action. For example, the power is generated according to a stepping action using the shoe 1a. The power generation unit 18 is described later in detail. The power generated by the power generation unit 18 is supplied to the electricity storage unit 19 and the electricity storage unit 19 is charged.

The electricity storage unit 19 includes an electric storage device such as a secondary battery and a capacitor. The electricity storage unit 19 may include a switch circuit to switch the start and stop of power supply, a rectification circuit and a boost circuit, and so on. Examples of the secondary battery include a lithium-ion battery, a sodium-sulfur battery, a lead-acid battery, a nickel-hydrogen battery, a nickel-zinc battery, a nickel-iron battery, a silver-zinc battery, a nickel-cadmium battery and a redox-flow battery. A plurality of secondary batteries may be combined and used. The capacitor is, for example, an electric double layer capacitor or a lithium ion capacitor.

"Operation of Portable Music Player"

Next, one example of operation of the portable music player 10 is described. First, the shoes 1 are worn, and, for example, the startup switch of the operation unit 13 is turned on. When the startup switch is turned on, power is supplied from the electricity storage unit 19 to each unit of the portable music player 10. For example, operation to instruct the playback of music content is performed by the operation unit 13. The operation unit 13 generates a control signal according to the operation and supplies the generated control signal to the control unit 11. The operation by the operation unit 13 may be performed by remote control.

The control unit 11 reads out predetermined music content data from the storage unit 16 according to the control signal supplied from the operation unit 13 and performs playback processing on the read music content data. The music content data subjected to the playback processing is applied is supplied from the control unit 11 to the amplification unit 14. The music content data is amplified by the amplification unit 14 and the amplified music content data is supplied to the speaker 15. The music content is played from the speaker 15.

Walking or the like using the shoes 1 is performed and the power generation unit 18 generates power according to a stepping action caused by walking. The power generated by the power generation unit 18 is supplied to the electricity storage unit 19 and the electricity storage unit 19 is stored. The power is supplied from the electricity storage unit 19 to each unit of the portable music player 10. Since the power stored in the electricity storage unit 19 is supplied to each unit of the portable music player 10, even in a case where the stepping action is interrupted, it is possible to continue the supply of the power to each unit of the portable music player 10.

When the use of the portable music player 10 ends, the startup switch of the operation unit 13 is turned off. When the startup switch is turned off, the supply of the power from the electricity storage unit 19 to each unit of the portable music player 10 stops and the playback of music content stops. When the stepping action is performed in a state where the supply of the power from the electricity storage unit 19 to each unit of the portable music player 10 stops, the electricity storage unit 19 can be charged by the power generated by the power generation unit 18. Here, in a case where the power is not supplied from the power generation unit 18 to the electricity storage unit 19 for a predetermined period of time, the supply of the power from the electricity storage unit 19 to each part may be stopped with an assumption that the use of the shoes 1 ends.

"Regarding Power Generation Unit"

Figure 3:
FIG. 3 is a schematic diagrammatic view to describe one example of a position in which a power generation unit is incorporated.

One example of the power generation unit 18 is described. The position surrounded by the dotted line in FIG. 3 shows one example of a position into which the power generation unit 18 is built. For example, the power generation unit 18 is built into a position stepped on by the heel in the shoe 1a. Although the name varies depending on the type of the shoe 1a, for example, the power generation unit 18 is built into a position called "stacking," "midsole" or "backstay," and so on. The power generation unit 18 is, for example, a generator of an electrostatic induction type using an electret.

Figure 4:
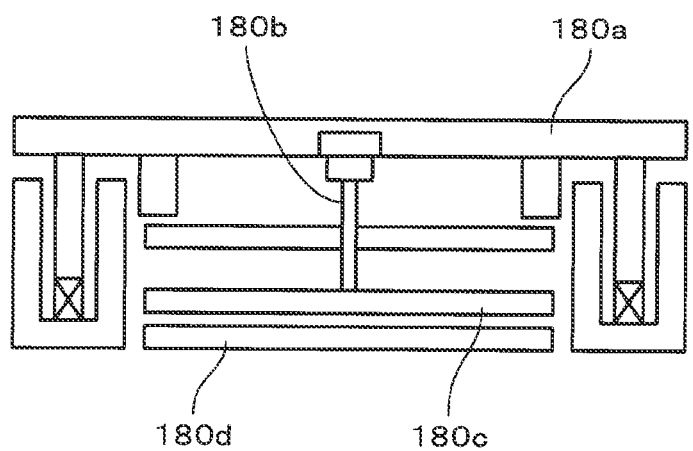
FIG. 4 is a schematic diagrammatic view to describe one example of a configuration of the power generation unit.

FIG. 4 illustrates one example of a configuration of the power generation unit 18. The power generation unit 18 adopts a configuration including, for example, a pressure application unit 180a, a conversion shaft 180b, an electret rotor 180c and an electret stator 180d. The pressure application unit 180a has flexibility to bend according to applied force. When an action to put the feet in the stepping action is performed, pressure in the vertical direction from the upper side to the lower side in the drawing is applied to the pressure application unit 180a. When an action to lift the feet in the stepping action is performed, force directed from the lower side to the upper side by the restoring force is applied to the pressure application unit 180a.

One end of the conversion shaft 180b is attached to the pressure application unit 180a. The electret rotor 180c is attached to the other end of the conversion shaft 180b. The conversion shaft 180b rotates in a predetermined direction according to the vertical pressure applied to the pressure application unit 180a, and converts the vertical force into the horizontal force. When the force directed from the upper side to the lower side is applied to the pressure application unit 180a, the conversion shaft 180b rotates in one direction, and, when the force directed from the lower side to the upper side is applied to the pressure application unit 180a, the conversion shaft 180b rotates in the other direction. Here, a configuration to convert the force in the vertical direction into the force in the horizontal direction is not limited to the configuration illustrated in FIG. 4 and various configurations can be adopted. A configuration based on the principle of bow drill is also possible.

The electret rotor 180c attached to the conversion shaft 180b rotates according to the rotation of the conversion shaft 180b. The electret rotor 180c is, for example, a substantially circular shape, and the other end of the conversion shaft 180b is attached near the center. One surface of the electret rotor 180c is a facing surface. The facing surface of the electret rotor 180c and the facing surface of the electret stator 180d face to each other. The electret stator 180d is, for example, a substantially circular shape and is fixed.

FIG. 5A illustrates one example of the facing surface of the electret rotor 180c. An electret film 181a in which electric charge is applied to a dielectric body is formed in part (for example, half) of the facing surface of the electret rotor 180c and the other parts are a substrate 181b. An electrostatic field is formed by the electret film 181a.

FIG. 5B illustrates one example of the facing surface of the electret stator 180d. In the facing surface of the electret stator 180d, as a plurality of electrodes, an electrode 182a, an electrode 182b, an electrode 182c . . . and an electrode 182h are formed. The plurality of electrodes are connected to an output circuit which is not illustrated in the power generation unit 18. Here, the positions in which the electret films and the electrodes are formed and the numbers of these can be adequately changed.

One example of operation of the power generation unit 18 is described. For example, when the stepping action is performed using the shoes 1 and an action to put the feet is performed, the force (pressure) in the vertical direction from the upper side to the lower side is applied to the pressure application unit 180a. The conversion shaft 180b rotates in a predetermined direction according to the vertical force applied to the pressure application unit 180a, and, by rotating the conversion shaft 180b, the force in the vertical direction is converted into the force in the horizontal direction. The electret rotor 180c rotates in a predetermined direction centering on the conversion shaft 180b, according to the rotation of the conversion shaft 180b. When the electret rotor 180c rotates, an area in which the electret film 181a and the electrode 182a or the like overlap with each other changes. An electrical signal is generated according to the change and the power generation unit 18 generates power.

In the stepping action, when an action to lift the feet is performed in a state where the feet are put, the force in the vertical direction from the lower side to the upper side is applied to the pressure application unit 180a by the restoring force. According to this vertical force, the conversion shaft 180b rotates in the direction opposite to the predetermined direction. When the conversion shaft 180b rotates, the electret rotor 180c rotates in the direction opposite to the predetermined direction. When the electret rotor 180c rotates, the area in which the electret film 181a and the electrode 182a or the like overlap with each other changes. An electrical signal is generated according to the change and the power generation unit 18 generates power. Also, since a mechanism to convert frequency normally converts frequency on the high frequency side and power generation in the power generation unit 18 continues by action of the inertial force, the alternating-current power at a plurality of periods is generated by one stepping action.

From the power generation unit 18, for example, the alternating-current power is subjected to amplitude modulation and output. In the stepping action, the average power immediately after the feet are put is large and gradually attenuates. By rectifying the alternating-current power in which the amplitude varies over time and performing smoothing processing after the rectification, it is possible to measure the change in the electric energy of one cycle according to one stepping action. For example, when envelope detection is performed using an LPF (Low Pass Filter), it is possible to measure a cycle including the stage on which the power generation amount by the power generation unit 18 is 0 or little and the stage on which the electric power generation decreases (attenuates) through the stage on which the power generation amount increases. By detecting the number of cycles (cycle number) with respect to the change in this electric energy, it is possible to detect the number of times the stepping action is performed. For example, the power output from the power generation unit 18 is rectified by a rectification circuit in the electricity storage unit 19 and the direct-current voltage is formed. An electric storage device in the electricity storage unit 19 is charged by the formed direct-current voltage. For example, the rectification circuit is formed with a diode bridge circuit.

As described above, in the first embodiment, the portable music player has the power generation unit and the power generation unit generates electricity and generates power. For example, the power generated by the power generation unit is supplied to each unit of the portable music player through the electricity storage unit. Therefore, it is not demanded to charge the portable music player.

Here, although the electret rotor 180c rotates in the example of the power generation unit 18 described above, the electret stator 180d may rotate. The electret rotor 180c and the electret stator 180d may rotate. In addition to the rotation, the electret rotor 180c may be slid in the horizontal direction.

In the portable music player 10, it may be possible to install a crystal radio that can be attached near the user's ears, and play music content using the crystal radio. The crystal radio has, for example, an antenna, in which a parallel resonance circuit and a crystal detector such as a diode are connected. The crystal radio also operates without power sources. The control unit 11 performs FM (Frequency Modulation) modulation on music content data at a specific frequency. The music content data subjected to FM modulation is transmitted to the crystal radio. For example, the music content data is transmitted by short-distance wireless communication. The transmitted music content data is detected and demodulated by the crystal radio. The demodulated music content data is played from earphones held by the crystal radio.

2. Second Embodiment

Outline of Second Embodiment

Next, the second embodiment is described. The second embodiment is an example where a control signal is formed by power generated the power generation unit.

Figure 6:
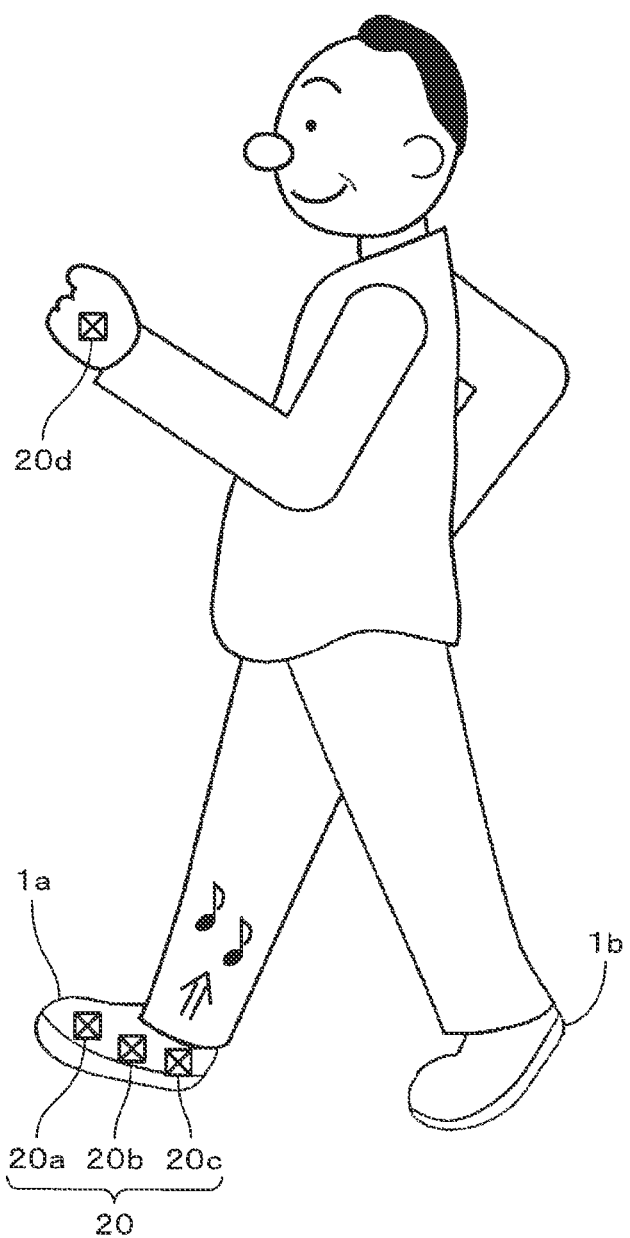
FIG. 6 is a schematic diagrammatic view illustrating the outline of the second embodiment.

FIG. 6 illustrates the outline of the second embodiment. A portable music player 20 in the second embodiment is integrally formed with the shoe 1a. The portable music player 20 adopts a configuration including a signal processing unit and controller 20a, a power generation unit 20b and a super-directional speaker 20c. Music content is played from the super-directional speaker 20c. The super-directional speaker 20c has directional characteristics to cause the music content to be heard in the vicinity of the ears of the user who is wearing the shoes 1. Therefore, the music content played from the super-directional speaker 20c are not diffused to the surroundings and only the user who is wearing the shoes 1 can listen to the played music content.

The portable music player 20 includes a detection unit 20d. For example, the detection unit 20d is separated from the portable music player 20, and, for example, operation with respect to the detection unit 20d is enabled in the user's hand. For example, a press operation is possible in the detection unit 20d.

In the second embodiment, it is possible to control the portable music player 20 by a predetermined motion (action). For example, it is possible to control the portable music player 20 according to the stepping action using the shoe 1a. The content of control can be arbitrarily set. For example, by performing the stepping action twice in a predetermined time (for example, five seconds), it is possible to start the playback of music content. By performing the stepping action three times in a predetermined time, it is possible to stop the playback of the music content. By performing the stepping action four times in a predetermined time, it is possible to skip the playback of the music content and play the next music content.

For example, the content of control corresponding to the stepping number is stored in a ROM (Read Only Memory) connected to the control unit 11. The content of control may be set. When the portable music player 20 is controlled by the stepping action, the detection unit 20d is pressed.

"Configuration of Portable Music Player"

Figure 7:
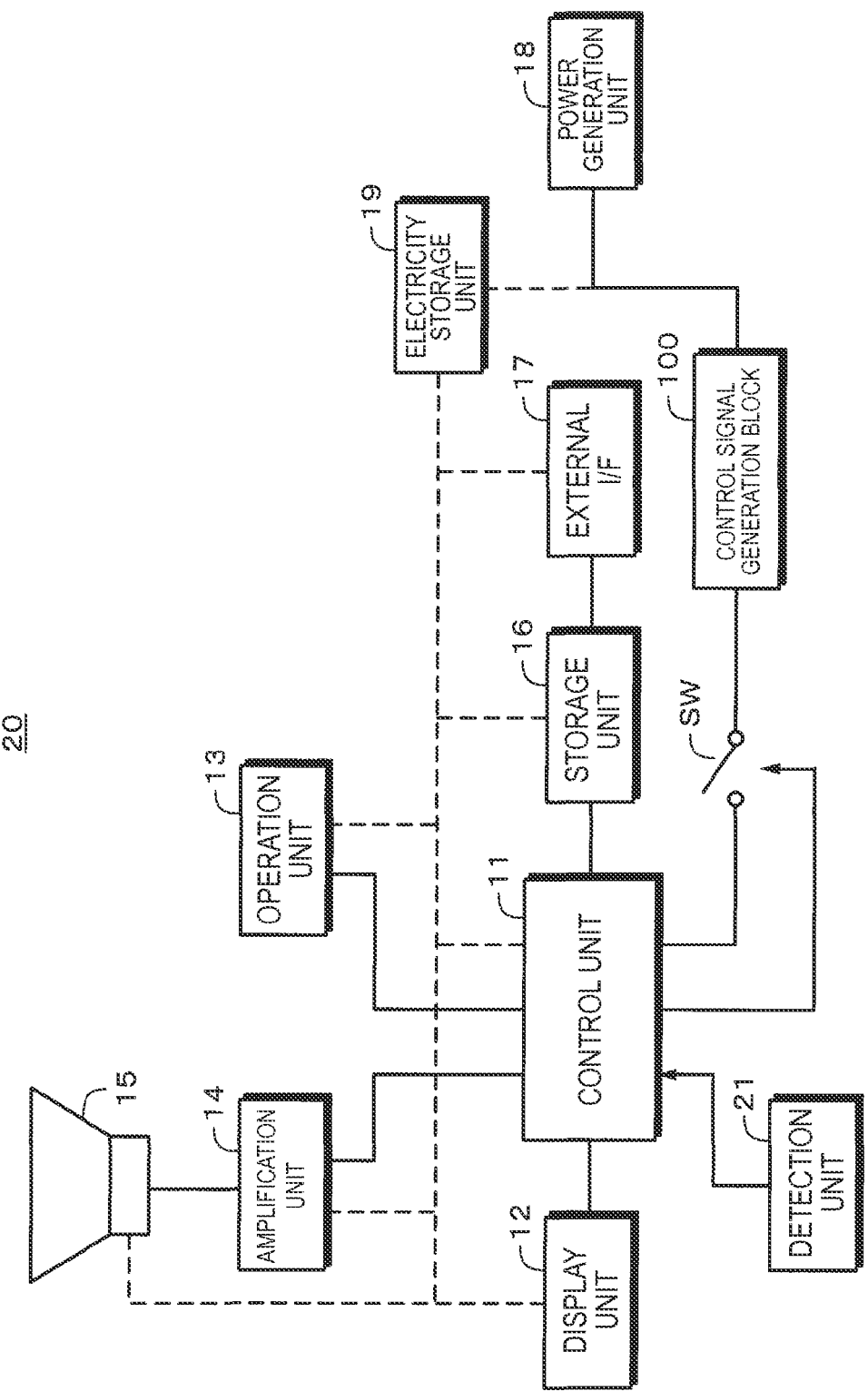
FIG. 7 is a block diagram illustrating one example of a configuration of a portable music player in the second embodiment.

FIG. 7 illustrates one example of a configuration of the portable music player 20 in the second embodiment. The portable music player 20 adopts a configuration including the control unit 11, the display unit 12, the operation unit 13, the amplification unit 14, the speaker 15, the storage unit 16, the external I/F 17, the power generation unit 18, the electricity storage unit 19, a control signal generation block 100, switch SW and a detection unit 21. The control unit 11 corresponds to the signal processing unit in 20a, and, for example, the operation unit 13 and the control signal generation block 100 correspond to a controller. The power generation unit 18 corresponds to the power generation unit 20b, the speaker 15 corresponds to the super-directional speaker 20c and the detection unit 21 corresponds to the detection unit 20d.

The display unit 12, the operation unit 13, the amplification unit 14 and the storage unit 16 are connected to the control unit 11. The speaker 15 is connected to the amplification unit 14. The external I/F 17 is connected to the storage unit 16. The portable music player 20 includes the power generation unit 18. The power generation unit 18 generates electricity according to a stepping action and generates power. The power generated by the power generation unit 18 is supplied to the electricity storage unit 19 and the electricity storage unit 19 is charged. The power is supplied from the electricity storage unit 19 to each unit of the portable music player 20 to operate the portable music player 20. In the figure, one example of a power supply line is shown by a dotted line. When the portable music player 20 operates, for example, music content is played.

The control unit 11 is connected to the detection unit 21. The detection unit 21 generates an operation detection signal when detecting a predetermined operation, and supplies the generated operation detection signal to the control unit 11. For example, when detecting a press operation for the detection unit 21, the detection unit 21 generates the operation detection signal. Subsequently, the detection unit 21 outputs the generated operation detection signal to the control unit 11. The predetermined operation is not limited to the press operation. For example, the detection unit 21 may be formed as a touch sensor and generate an operation detection signal when the detection unit 21 is touched. The detection unit 21 may be a sensor that detects heat caused by the contact operation.

Also, the control unit 11 and the detection unit 21 may be connected to each other by wired connection or wireless connection. However, since the wired connection requires a cable, it is preferable that the control unit 11 and the detection unit 21 are connected by radio. The operation detection signal output from the detection unit 21 is transmitted by radio in a transmission unit which is not illustrated. The transmitted operation detection signal is received by a reception unit which is not illustrated, and the received operation detection signal is supplied to the control unit 11.

The control unit 11 is connected to the control signal generation block 100 through switch SW. The control unit 11 switches ON/OFF of switch SW. For example, when the operation detection signal is supplied from the detection unit 21, the control unit 11 turns on switch SW. Also, switch SW may be installed between the control signal generation block 100 and the power generation unit 18.

The control signal generation block 100 is connected to the power generation unit 18 and the power generated by the power generation unit 18 is supplied to the control signal generation block 100. The control signal generation block 100 generates a control signal by the power supplied from the power generation unit 18. The control signal generated in the control signal generation block 100 is supplied to the control unit 11 through switch SW. The control unit 11 performs predetermined processing according to the supplied control signal.

When the press operation with respect to the detection unit 21 is cancelled, the detection unit 21 stops the output of the operation detection signal. When the supply of the operation detection signal from the detection unit 21 stops, the control unit 11 turns off switch SW. Since switch SW is turned off, the control signal generated in the control signal generation block 100 is not supplied to the control unit 11.

"Regarding Control Signal Generation Block"

Figure 8:
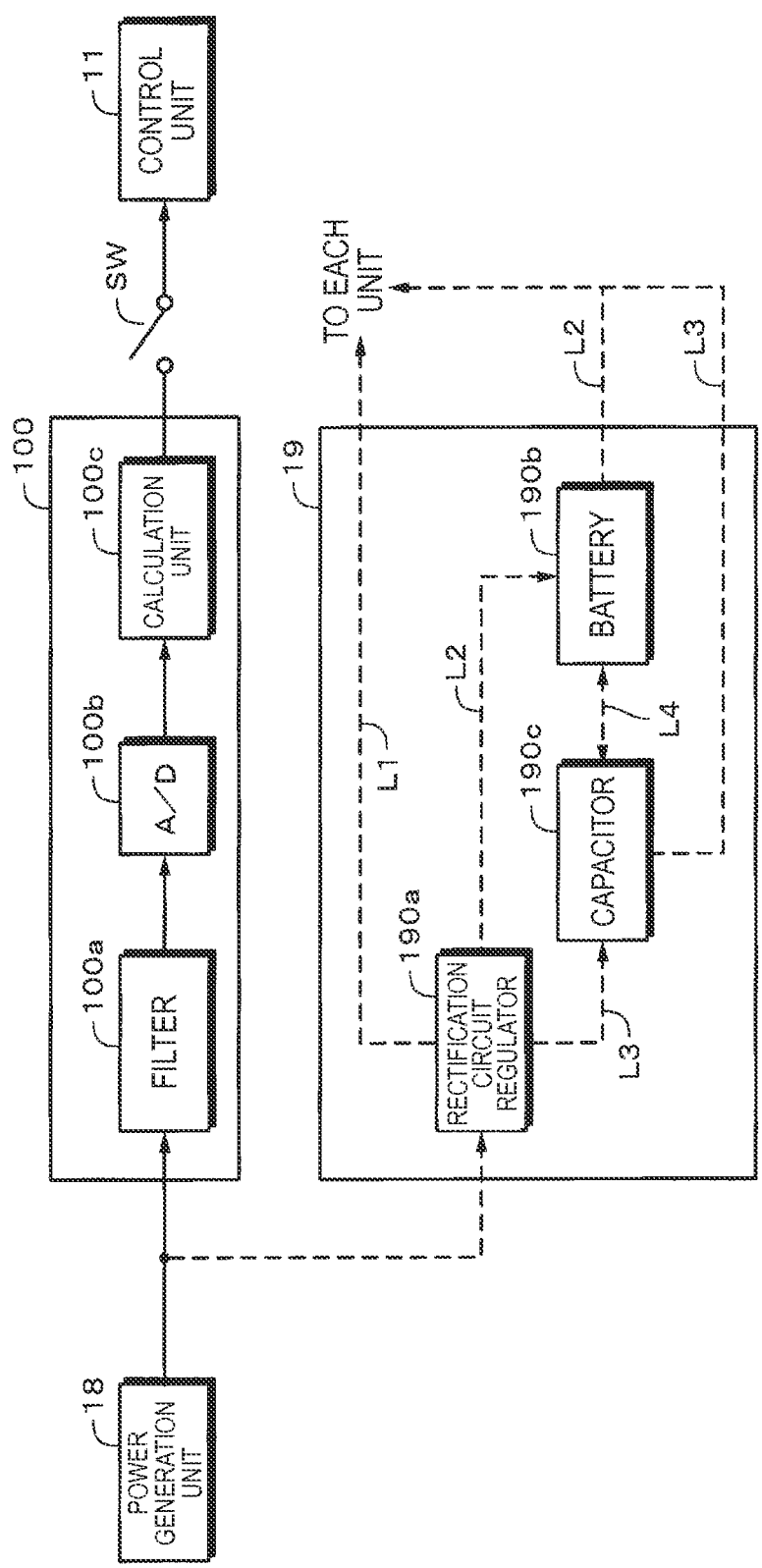
FIG. 8 is a block diagram to describe one example of a configuration of a control signal generation block.

With reference to FIG. 8, one example of a configuration of the control signal generation block 100 is described. For example, the control signal generation block 100 includes, for example, a filter 100*a*, an A/D (Analog to Digital) conversion unit 100*b* and a calculation unit 100*c*.

The power generated by the power generation unit 18 is distributed, a load of high resistance (high impedance) is applied to one power and a load of low resistance (low impedance) is applied to the other power. The power on the high impedance side is input in the control signal generation block 100. For example, the power input in the control signal generation block 100 is rectified and subjected to filter processing by the filter 100*a* after the rectification. For example, the filter processing including waveform shaping processing, smoothing processing (LPF processing) and noise removal processing is performed by the filter 100*a*. An electrical signal subjected to the filter processing is converted into a digital signal by the A/D conversion unit 100*b*. The digital signal output from the A/D conversion unit 100*b* is supplied to the calculation unit 100*c*.

The calculation unit 100*c* measures the change in electric energy generated by the power generation unit 18, using the digital signal subjected to filter processing. As described in the first embodiment, for example, when the power generated by the power generation unit 18 is subjected to filter processing according to one stepping action, the change in the electric energy of one cycle is measured. The calculation unit 100*c* measures the cycle number of the change in the electric energy by the use of the digital signal supplied from the A/D conversion unit 100*b*. Subsequently, the calculation unit 100*c* detects the number of times the stepping action is performed, from the measured cycle number. For example, in a case where the change in the electric energy is measured twice (the cycle number is 2), the calculation unit 100*c* determines that the stepping action was performed twice.

The calculation unit 100*c* generates a control signal to cause the control unit 11 to perform processing corresponding to the determined stepping action number. For example, when it is determined that the number of stepping actions is two, the calculation unit 100*c* generates a control signal to start the playback of music content. The generated control signal is output from the calculation unit 100*c*. Subsequently, the control signal is output from the control signal generation block 100.

In a case where switch SW is turned on, the control signal output from the control signal generation block 100 is supplied to the control unit 11. The control unit 11 performs processing according to the control signal. For example, the control unit 11 reads out predetermined music content data from the storage unit 16 and performs playback processing on the read music content data.

In a case where the change in the electric energy of one cycle is measured three times, the calculation unit 100*c* determines that three stepping actions were performed. When it is determined that the number of stepping actions is three, for example, the calculation unit 100*c* generates a control signal to stop the playback of music content. The control signal is supplied to the control unit 11 through switch SW. The control unit 11 stops the playback processing of the music content according to the supply of the control signal.

Also, other parameters than the change in the electric energy may be determined by the calculation unit 100*c*. For example, an interval between signals input from the power generation unit 18 into the control signal generation block 100 may be determined. The control signal corresponding to the determined interval may be generated by the calculation unit 100*c*. The calculation unit 100*c* may determine the level of the electrical signal supplied from the power generation unit 18. A control signal based on the determined level may be generated by the calculation unit 100*c*.

An output on the low impedance side is supplied to the electricity storage unit 19. Most of the power from the power generation unit 18 is distributed to the low impedance side. Therefore, it is possible to supply most of the power generated by the power generation unit 18 to the electricity storage unit 19. The power supplied to the electricity storage unit 19 is rectified by a rectification circuit 190*a* in the electricity storage unit 19 and the direct-current voltage is formed. Also, it may be possible to install a regulator for pressure rising or pressure lowering, and adequately perform processing for pressure rising or pressure lowering according to the power level.

For example, the direct-current voltage formed by the rectification circuit 190*a* is directly supplied to each unit of the portable music player 20 through power supply line L1. A battery 190*b* may be installed in the electricity storage unit 19 and the direct-current voltage from the rectification circuit 190*a* may be supplied to the battery 190*b* through power supply line L2. Subsequently, the power may be supplied from the battery 190*b* to each unit of the portable music player 20 through power supply line L2.

A capacitor 190*c* may be installed in the electricity storage unit 19 and the direct-current voltage from the rectification circuit 190*a* may be supplied to the capacitor 190*c* through power supply line L3. Subsequently, the power may be supplied from the capacitor 190*c* to each unit of the portable music player 20 through power supply line L3. In addition, the battery 190*b* and the capacitor 190*c* may be installed and the power may be exchanged between the battery 190*b* and the capacitor 190*c* through power supply line L4. When music content is played while the stepping action is performed, the capacitor 190*c* may be used, and, when only the stepping action is performed, the battery 190*b* may be used. Also, the above-mentioned configuration of the electricity storage unit 19 is one example, and the configuration of the electricity storage unit 19 and a method of supplying power to each unit of the portable music player 20 can be adequately changed.

"Operation of Portable Music Player"

One example of operation of the portable music player 20 is described. When a stepping action caused by walking or the like is performed in a state where the shoes 1 are worn, the power generation unit 18 generates electricity and generates power. The power generated by the power generation unit 18 is supplied to the electricity storage unit 19. The power supplied to the electricity storage unit 19 is rectified to direct current by the rectification circuit 190*a* and a direct-current voltage is formed. The electricity storage unit 19 is charged by the formed direct-current voltage. Also, in a case where the power generation unit 18 generates the direct-current voltage, the direct-current voltage is directly supplied to the electricity storage unit 19 without the rectification processing.

For example, control using the operation unit 13 is performed for the portable music player 20. For example, when an operation to instruct the playback start of music content is performed using the operation unit 13, a control signal based on the operation content is generated by the operation unit 13. The operation unit 13 supplies the generated control signal to the control unit 11. The control unit 11 performs processing based on the control signal. For example, the control unit 11 reads out predetermined music content data from the storage unit 16 and performs playback processing on the read music content data. Subsequently, the control unit 11 supplies the music content data subjected to the playback processing to the amplification unit 14.

The amplification unit 14 amplifies the music content data supplied from the control unit 11 at a predetermined amplification factor. The amplified music content data is supplied to the speaker 15. The music content is played from the speaker 15.

It is assumed that the portable music player 20 can be controlled by motion. For example, the portable music player 20 is controlled by a stepping action. When the portable music player 20 is controlled by the stepping action, for example, the detection unit 21 is pressed. When the detection unit 21 is pressed, an operation detection signal is generated by the detection unit 21 and the generated operation detection signal is supplied to the control unit 11. When the operation detection signal is supplied, the control unit 11 turns on switch SW. Subsequently, for example, the stepping action using the shoe 1*a* is consecutively performed twice in a predetermined time in a state where the detection unit 21 pressed. The power generation unit 18 generates power according to this stepping action. The power generated by the power generation unit 18 is supplied to the control signal generation block 100.

The control signal generation block 100 rectifies the electrical signal supplied from the power generation unit 18 and performs filter processing on the rectified electrical signal by the filter 100*a*. The electrical signal subjected to the filter processing is converted into a digital signal by the A/D conversion unit 100*b*. The digital signal is supplied to the calculation unit 100*c*. For example, using the digital signal supplied from the A/D conversion unit 100*b*, the calculation unit 100*c* determines the cycle number of the change in the electric energy of the power input in the control signal generation block 100. The cycle number is determined in a predetermined time (for example, five seconds). In this example, since the stepping action was performed twice, it is determined that the change in the electric energy of one cycle is measured twice and the cycle number is two. Since the cycle number is two, the calculation unit 100*c* determines that the stepping action was performed twice.

The calculation unit 100*c* generates a control signal corresponding to the determined stepping action number. For example, the calculation unit 100*c* generates a control signal to start the playback of music content, in response to the fact that the number of stepping actions is two. The control signal generated by the calculation unit 100*c* is output from the control signal generation block 100 and the output control signal is supplied to the control unit 11 through switch SW.

The control unit 11 performs processing based on the control signal supplied from the control signal generation block 100. For example, the control unit 11 performs processing to start the playback of music content. That is, the control unit 11 reads out predetermined music content data from the storage unit 16 and performs playback processing on the read music content data. The control unit 11 supplies the music content data subjected to the playback processing to the amplification unit 14. The music content data is amplified by the amplification unit 14 and the amplified music content data is supplied to the speaker 15. The music content is played from the speaker 15.

When the press operation for the detection unit 21 is cancelled, the supply of the operation detection signal from the detection unit 21 to the control unit 11 stops. When the supply of the operation detection signal stops, the control unit 11 turns off switch SW. After switch SW is turned off, the control signal output from the control signal generation block 100 is not supplied to the control unit 11. When the press operation for the detection unit 21 is cancelled, the signal generated by the power generation unit 18 may be supplied to only the electricity storage unit 19. For example, switch SW may be installed between the power generation unit 18 and the control signal generation block 100, and turned off according to the cancellation of the press operation with respect to the detection unit 21.

The press operation is performed with respect to the detection unit 21 again during the playback of music content, and, in a state where the detection unit 21 is pressed, a stepping action using the shoe 1*a* is performed three times in a predetermined time. The operation detection signal is supplied to the control unit 11 according to the press of the detection unit 21. When the operation detection signal is supplied, the control unit 11 turns on switch SW. Subsequently, the power generation unit 18 generates power according to three stepping actions. The generated power is supplied from the power generation unit 18 to the control signal generation block 100.

The electrical signal supplied to the control signal generation block 100 is subjected to filter processing by the filter 100*a* and the electrical signal subjected to the filter processing is converted into a digital signal by the A/D conversion unit 100*b*. The digital signal is supplied from the A/D conversion unit 100*b* to the calculation unit 100*c*.

For example, the calculation unit 100*c* determines the cycle number of the change in the electric energy by the use of the digital signal. Since the stepping action was performed three times, the change in the electric energy of one cycle is measured three times and it is determined that the cycle number is three. Since the cycle number is three, the calculation unit 100*c* determines that the stepping action was performed three times. Subsequently, the calculation unit 100*c* generates a control signal according to the fact that the number of stepping actions is three. For example, it generates a control signal to stop the playback of music content. The generated control signal is supplied to the control unit 11 through switch SW. The control unit 11 stops the playback of the music content according to the supplied control signal.

Thus, in the portable music player 20, a control signal is formed by the power generated by the power generation unit 18 and the formed control signal is supplied to the control unit 11. That is, the operation unit 13 and the control signal generation block 100 function as one example of a controller. Also, all control with respect to the portable music player 20 may be performed by a stepping action and the component of the operation unit 13 may be omitted. In this case, only the control signal generation block 100 functions as a controller.

Even in a case where the portable music player 20 is controlled by motion, most of the power output from the power generation unit 18 can be supplied to the electricity storage unit 19. Therefore, it is possible to charge the electricity storage unit 19 and continue the supply of the power from the electricity storage unit 19 to each unit of the portable music player 20. In addition, only when the stepping action is performed while the detection unit 21 is pressed, control by the stepping action becomes effective. Therefore, in a case where the detection unit 21 is not pressed and the stepping action is performed, it is possible to prevent processing that is not intended by the user from being performed.

A variation example of the portable music player 20 is described. Also, the variation example described below is applicable to not only the second embodiment but also other embodiments within a range in which technical contradiction is not caused.

Figure 9:
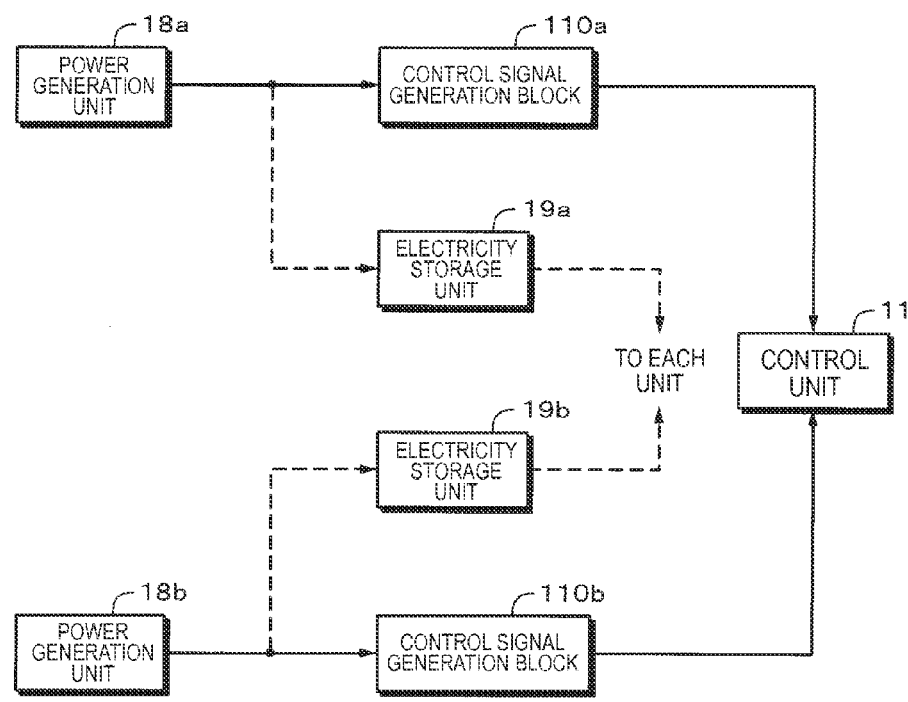
FIG. 9 is a block diagram to describe a variation example.

As illustrated in FIG. 9, a plurality of power generation units may be installed in the portable music player 20. For example, the power generation unit 18a and the power generation unit 18b may be installed. A control signal generation block 110a and the electricity storage unit 19a are installed with respect to the power generation unit 18a. A control signal generation block 110b and the electricity storage unit 19b are provided with respect to the power generation unit 18b. The control signal generation block 110a and the control signal generation block 110b are assumed to be the same component as the control signal generation block 100, and perform processing similar to that of the control signal generation block 100.

Power output from the electricity storage units 19a and 19b is supplied to each unit of the portable music player 20. In the portable music player 20, a component to which the power is supplied from the electricity storage unit 19a and a component to which the power is supplied from the electricity storage unit 19b may be set respectively. In addition, the power may be supplied from one electricity storage unit in which the battery remaining capacity is larger out of the electricity storage unit 19a and the electricity storage unit 19b.

The control signals output from the control signal generation blocks 110a and 110b are supplied to the control unit 11. The control unit 11 performs processing based on the control signal supplied from the control signal generation block 110a and the control signal supplied from the control signal generation block 110b.

Figure 10:
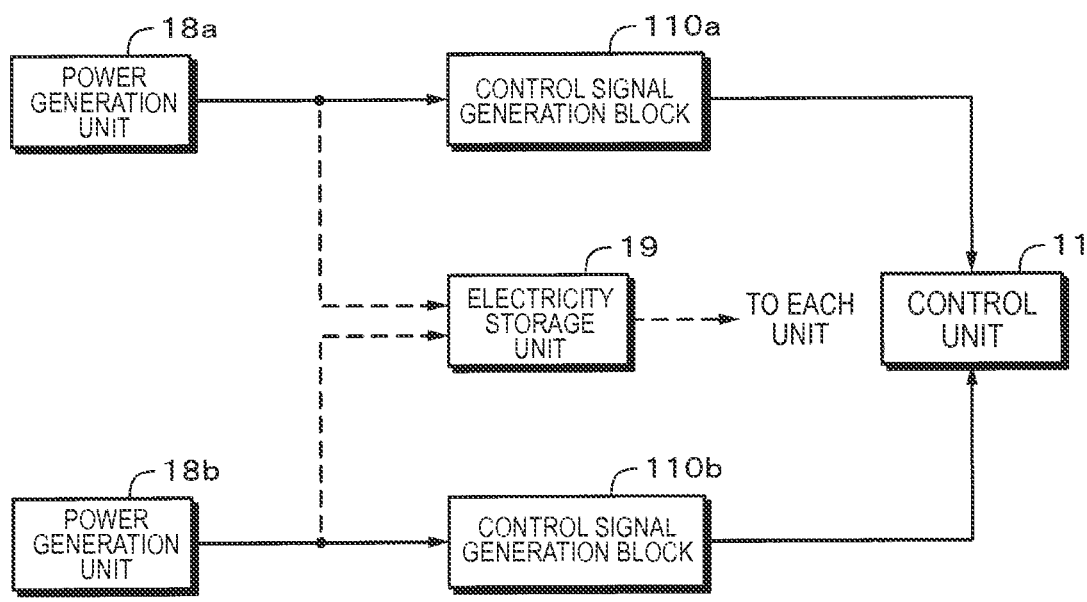
FIG. 10 is a block diagram to describe another variation example.

As illustrated in FIG. 10, a plurality of power generation units may be installed and the power generated by each power generation unit may be supplied to one electricity storage unit. For example, the power generation unit 18a and the power generation unit 18b are installed and the electricity storage unit 19 is charged by the power supplied from the power generation units 18a and 18b.

Figure 11:
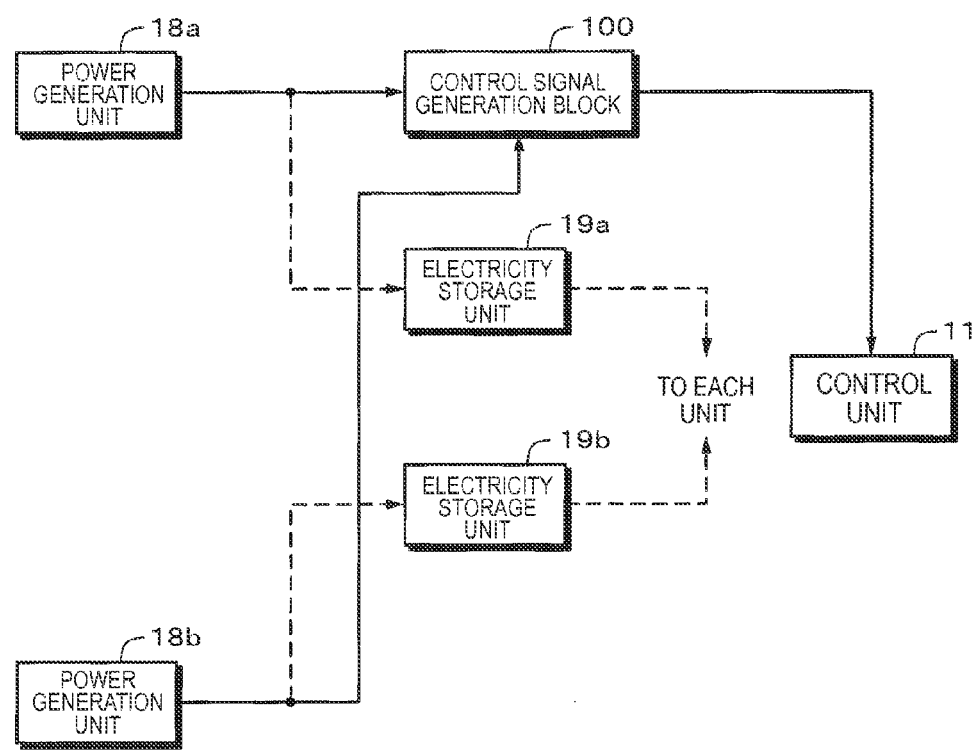
FIG. 11 is a block diagram to describe another variation example.

In a case where the battery 190b and the capacitor 190c are installed in the electricity storage unit 19, the battery 190b may be charged by the power from the power generation unit 18a and the capacitor 190c may be charged by the power from the power generation unit 18b. The power from the power generation units 18a and 18b may be switched and supplied to the electricity storage unit 19. As illustrated in FIG. 11, the power output from the power generation units 18a and 18b may be supplied to one control signal generation block 100.

Figure 12:
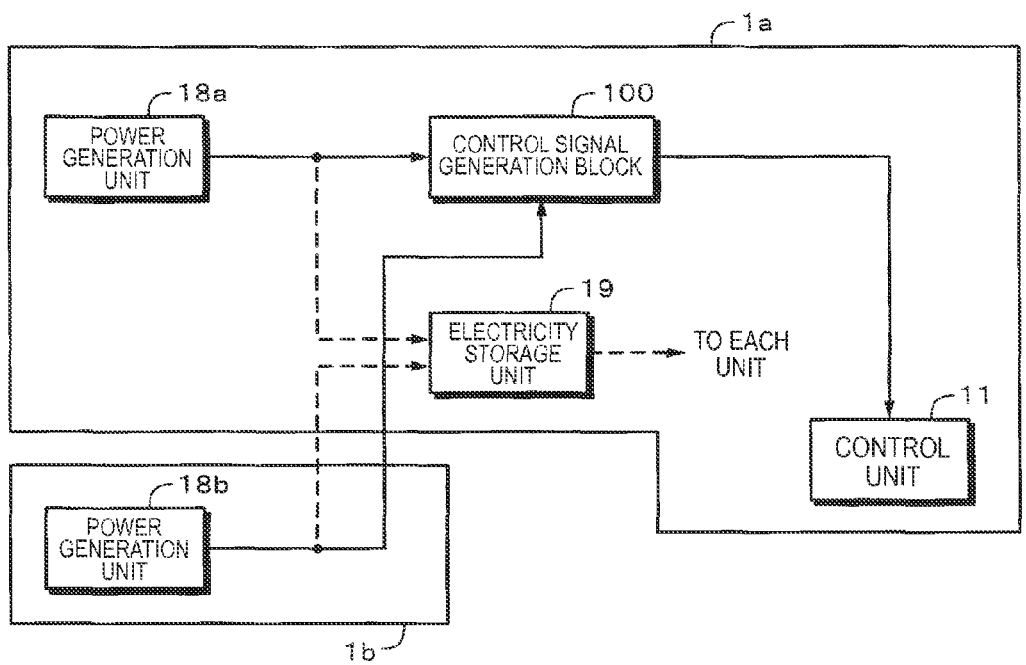
FIG. 12 is a block diagram to describe another variation example.

Also, the power generation unit may be installed in the shoe 1b. As illustrated in FIG. 12, the shoe 1a includes the power generation unit 18a, the control signal generation block 100, the electricity storage unit 19, the control unit 11 and a reception processing unit which is not illustrated. The power generation unit 18b and a transmission processing unit which is not illustrated are installed in the shoe 1b.

The power generated by the power generation unit 18b is distributed to the high impedance side and the low impedance side. The power output from the low impedance side is transmitted by radio in the transmission processing unit. The power transmitted by radio is received by the reception processing unit in the shoe 1a. The power received by the reception processing unit is supplied to the electricity storage unit 19. Thus, it is possible to install the power generation unit 18b in the shoe 1b and charge the electricity storage unit 19 by the power generated by the power generation unit 18b according to a stepping action using the shoe 1b.

The power output from the high impedance side is transmitted by radio from the transmission processing unit of the shoe 1b to the shoe 1a. The transmitted electrical signal is received in the reception processing unit of the shoe 1a. The received electrical signal is supplied to the control signal generation block 100. Here, the power with the cycle number based on the number of stepping actions using the shoe 1a is supplied from the power generation unit 18a to the control signal generation block 100. In addition, the power with the cycle number based on the number of stepping actions using the shoe 1b is transmitted by radio from the power generation unit 18b.

The power supplied from the power generation unit 18a is subjected to filter processing by the filter 100a in the control signal generation block 100 and the signal subjected to the filter processing is converted into a digital signal by the A/D conversion unit 100b. The calculation unit 100c determines the cycle number of the change in the electric energy by the use of the digital signal. The calculation unit 100c determines stepping action number M corresponding to the determined cycle number.

The power supplied from the power generation unit 18b is subjected to filter processing by the filter 100a in the control signal generation block 100 and the signal subjected to the filter processing is converted into a digital signal by the A/D conversion unit 100b. The calculation unit 100c determines the cycle number of the change in the electric energy by the use of the digital signal. The calculation unit 100c calculates stepping action number N corresponding to the determined cycle number.

The calculation unit 100c generates a control signal based on number M and number N. For example, in the case of M=1 and N=0, a control signal to cause the control unit 11 to start the playback of music content is generated, and, in the case of M=0 and N=1, a control signal to cause the control unit 11 to stop the playback of the music content is generated. For example, in the case of M=2 and N=0, a control signal to cause the control unit 11 to skip the currently-played music content is generated, and, in the case of M=0 and N=2, a control signal to cause the control unit 11 to play (reverse-skip) music content previous to the currently-played music content is generated. The control signal generated by the calculation unit 100c is supplied to the control unit 11. In the variation example illustrated in FIG. 12, it is possible to control the portable music player 20 according to the stepping action of both feet. More control can be performed on the portable music player 20.

3. Third Embodiment

Outline of Third Embodiment

Next, the third embodiment is described. In the third embodiment, music content data subjected to playback processing is transmitted by radio to a headset and the music content is played by the headset.

Figure 13:
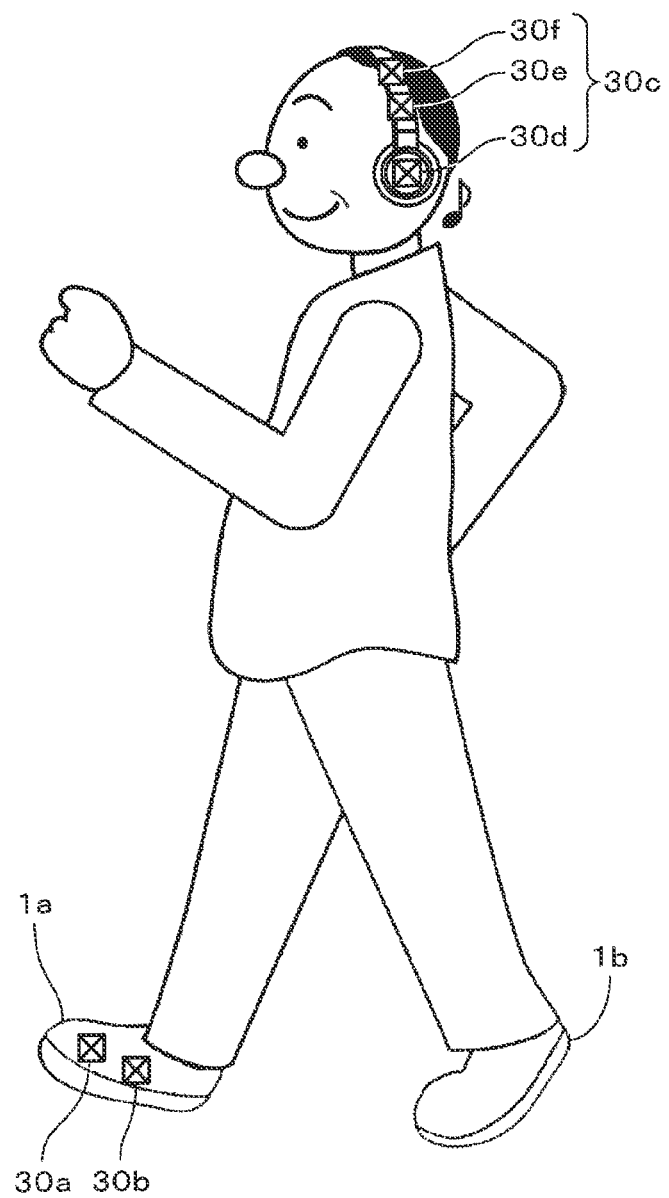
FIG. 13 is a schematic diagrammatic view illustrating the outline of the third embodiment.

FIG. 13 illustrates the outline of the third embodiment. A portable music player 30 in the third embodiment includes a signal processing unit and controller 30a and a power generation unit 30b. The signal processing unit and controller 30a and the power generation unit 30b are integrally formed with the shoe 1a. The portable music player 30 further includes a headset 30c. For example, the headset 30c includes a processing unit 30d, a power generation unit 30e and a sensor 30f. For example, the processing unit 30d is formed with a communication unit, an amplification unit and a speaker. For example, the power generation unit 30e is formed with a power generation unit and an electricity storage unit.

Music content data subjected to playback processing in the signal processing unit of the portable music player 30 is transmitted to, for example, the headset 30c by near field communication. The transmitted music content data is received in the headset 30c. In the headset 30c, demodulation processing and amplification processing are performed on the received music content data and the music content is played from the speaker of the headset 30c.

"Configuration of Portable Music Player"

Figure 14:
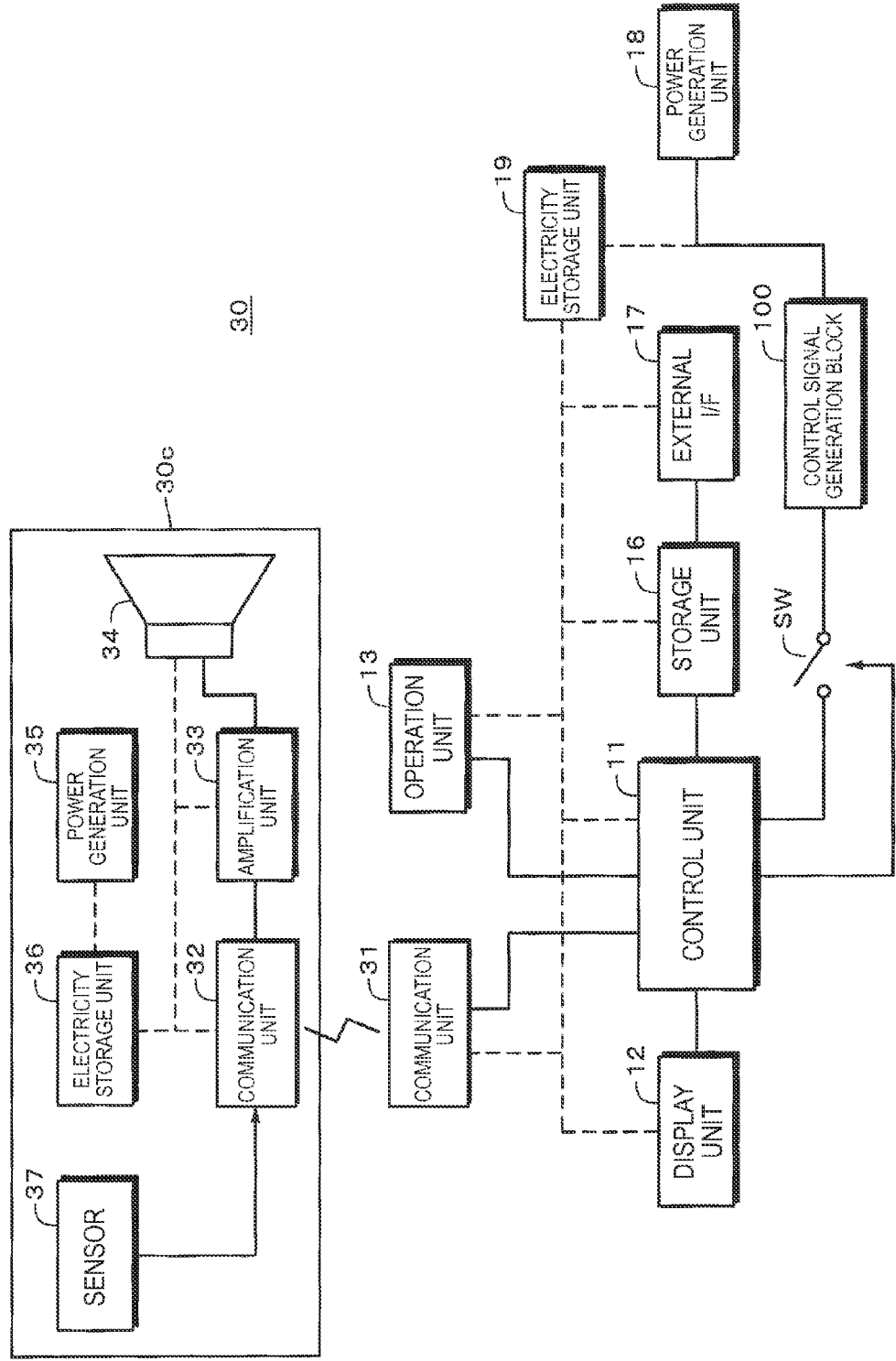
FIG. 14 is a block diagram illustrating one example of a configuration of a portable music player in the third embodiment.

FIG. 14 illustrates one example of the configuration the portable music player 30. The portable music player 30 adopts a configuration including the control unit 11, the display unit 12, the operation unit 13, the storage unit 16, the external I/F 17, the power generation unit 18, the electricity storage unit 19, a communication unit 31, the control signal generation block 100, switch SW and the headset 30c. The control unit 11 corresponds to the signal processing unit 30a. The power generation unit 18 corresponds to the power generation unit 30b.

The display unit 12, the operation unit 13, the storage unit 16 and the communication unit 31 are connected to the control unit 11. The external I/F 17 is connected to the storage unit 16. The power generation unit 18 generates electricity according to a stepping action and generates power. The power generated by the power generation unit 18 is supplied to the electricity storage unit 19 and the electricity storage unit 19 is charged. The power is supplied from the electricity storage unit 19 to each unit of the portable music player 30 and the portable music player 30 operates. In the figure, one example of a power supply line is shown by a dotted line. When the portable music player 30 operates, for example, music content is played.

The control unit 11 is connected to the control signal generation block 100 through switch SW. The control signal generation block 100 is connected to the power generation unit 18 and generates a control signal by the power supplied from the power generation unit 18. The control unit 11 switches ON/OFF of switch SW. For example, when an operation detection signal is supplied from a sensor 37, the control unit 11 turns on switch SW. When switch SW is turned on, the control signal generated in the control signal generation block 100 is supplied to the control unit 11. The control unit 11 performs predetermined processing according to the supplied control signal.

The communication unit 31 is connected to the control unit 11. The communication unit 31 receives a signal transmitted from a communication unit 32 and supplies it to the control unit 11. For example, the communication unit 31 receives an operation detection signal transmitted from the communication unit 32. Demodulation processing or the like is applied to the received operation detection signal and the operation detection signal subjected to the demodulation processing or the like is supplied to the control unit 11. The control unit 11 to which the operation detection signal is supplied turns on switch SW.

In addition, the communication unit 31 transmits the signal supplied from the control unit 11, to the communication unit 32. For example, music content data subjected to playback processing by the control unit 11 is supplied to the communication unit 31. The communication unit 31 performs modulation processing or the like on the music content data supplied from the control unit 11, and transmits the music content data subjected to the modulation processing or the like to the headset 30c by near field communication.

As a modulation scheme of the modulation processing performed by the communication units 31 and 32, it is possible to adequately adopt AM (Amplitude Modulation) modulation or FM (Frequency Modulation) modulation, and so on. As a scheme of near field communication performed between the communication unit 31 and the communication unit 32, it is possible to adopt Bluetooth (registered trademark) or Zigbee (registered trademark), and so on. It may be possible to use a human body as a conductor and use human body communication to perform communication by passing a slight electric current through the human body.

The headset 30c adopts a configuration including the communication unit 32, an amplification unit 33, a speaker 34, a power generation unit 35, an electricity storage unit 36 and the sensor 37. The communication unit 32 receives music content data transmitted from the communication unit 31. Subsequently, the communication unit 32 performs demodulation processing or the like on the received music content data. The music content data subjected to the demodulation processing or the like is supplied to the amplification unit 33.

In addition, the communication unit 32 modulates the operation detection signal supplied from the sensor 37 in a predetermined modulation scheme and transmits the modulated operation detection signal to the communication unit 31. The transmitted operation detection signal is received by the communication unit 31. Also, in communication performed by the communication units 31 and 32, for example, a frequency band used at the time of transmitting and receiving the operation detection signal and a frequency band used at the time of transmitting and receiving the music content data are assumed to be different frequency bands.

The amplification unit 33 amplifies the music content data supplied from the communication unit 32 at a predetermined amplification factor. The amplified music content data is supplied from the amplification unit 33 to the speaker 34 and the music content is played from the speaker 34.

For example, the power generation unit 35 is a solar cell installed on the surface of the headset 30c. The power generation unit 35 may be an apparatus (any of an electrostatic type, electromagnetic type, inverse-magnetostriction type and piezoelectric type is acceptable) that generates electricity according to displacement by vibration or movement, thermoelectric conversion elements that generate electricity by heat or an enzyme battery, and so on. The power generated by the power generation unit 35 is supplied to the electricity storage unit 36 and the electricity storage unit 36 is charged. In a case where the alternating-current power is supplied from the power generation unit 35, the alternating-current power is rectified in the rectification circuit of the electricity storage unit 36 and the direct-current voltage is formed. The electricity storage unit 36 is charged by the formed direct-current voltage.

The electricity storage unit 36 includes an electric storage device such as a secondary battery and a capacitor. The electricity storage unit 36 may include a switch circuit to switch the start and stop of power supply, a rectification circuit and a boost circuit, and so on. Examples of the secondary battery include a lithium-ion battery, a sodium-sulfur battery, a lead-acid battery, a nickel-hydrogen battery, a nickel-zinc battery, a nickel-iron battery, a silver-zinc battery, a nickel-cadmium battery and a redox-flow battery. A plurality of secondary batteries may be combined and used. The capacitor is, for example, an electric double layer capacitor or a lithium ion capacitor.

For example, the sensor 37 is a touch sensor that is installed in a predetermined position on the surface of the headset 30c and detects a contact operation with respect to the sensor 37. It may be a sensor that detects heat. When detecting that the sensor 37 is touched, the sensor 37 generates an operation detection signal and supplies the generated operation detection signal to the communication unit 32. The operation detection signal is supplied to the control unit 11 through the communication units 32 and 31.

"Operation of Portable Music Player"

One example of operation of the portable music player 30 is described. When a stepping action such as walking or the like is performed using the shoes 1, the power generation unit 18 generates electricity and generates power. For example, the power generated by the power generation unit 18 is rectified in the rectification circuit 190a of the electricity storage unit 19 and the direct-current voltage is formed. The electricity storage unit 19 is charged by the formed direct-current voltage.

For example, control using the operation unit 13 is performed on the portable music player 30. For example, when an operation to instruct the playback start of music content is performed using the operation unit 13, a control signal based on the operation content is generated by the operation unit 13. The operation unit 13 supplies the generated control signal to the control unit 11. The control unit 11 performs processing according to the control signal. For example, the control unit 11 reads out predetermined music content data from the storage unit 16 and performs playback processing on the read music content data. Subsequently, the control unit 11 supplies the music content data subjected to the playback processing to the communication unit 31.

The communication unit 31 performs modulation processing or the like on the music content data supplied from the control unit 11. The music content data subjected to the modulation processing or the like by the communication unit 31 is transmitted from the communication unit 31 to the communication unit 32. The music content data transmitted from the communication unit 31 is received by the communication unit 32. The communication unit 32 performs demodulation processing or the like on the received music content data. The music content data subjects to the demodulation processing or the like by the communication unit 32 is supplied to the amplification unit 33. The amplification unit 33 amplifies the music content data supplied from the communication unit 32 at the predetermined amplification factor. The amplified music content data is supplied to the speaker 34. The music content is played from the speaker 34.

Control by motion is assumed to be enabled for the portable music player 30. For example, the portable music player 30 is controlled by the stepping action. When control by motion is performed, for example, a contact operation that touches the sensor 37 is performed. When the contact operation is performed, the sensor 37 generates an operation detection signal and supplies the generated operation detection signal to the communication unit 32. The communication unit 32 modulates the operation detection signal supplied from the sensor 37 and transmits the modulated operation detection signal to the communication unit 31.

The transmitted operation detection signal is received by the communication unit 31 and the received operation detection signal is subjected to demodulation processing or the like by the communication unit 31. The operation detection signal subjected to the demodulation processing or the like is supplied from the communication unit 31 to the control unit 11. The control unit 11 turns on switch SW according to the supply of the operation detection signal. Subsequently, in a state where the contact operation is performed on the sensor 37, for example, the stepping action using the shoe 1a is consecutively performed twice in a predetermined time. The power generation unit 18 generates power according to this stepping action. The generated power is supplied to the control signal generation block 100.

The control signal generation block 100 performs filter processing on the power supplied from the power generation unit 18, using the filter 100a. The signal subjected to the filter processing is converted into a digital signal by the A/D conversion unit 100b. The digital signal is supplied to the calculation unit 100c. The calculation unit 100c determines the cycle number of the change in the electric energy by the use of the digital signal supplied from the A/D conversion unit 100b. In this example, according to two stepping actions, the change in the electric energy of one cycle is measured twice by the calculation unit 100c. Since the cycle number is two, the calculation unit 100c determines that the stepping action was performed twice.

The calculation unit 100c generates a control signal based on the determined stepping action number. For example, the calculation unit 100c generates a control signal to start the playback of music content, in response to the fact that the number of stepping actions is two. The generated control signal is supplied to the control unit 11 through switch SW.

The control unit 11 performs processing according to the control signal supplied from the control signal generation block 100. For example, the control unit 11 performs processing to start the playback of music content. That is, the control unit 11 reads out predetermined music content data from the storage unit 16 and performs playback processing on the read music content data. The control unit 11 supplies the music content data subjected to the playback processing to the communication unit 31. The music content data is transmitted from the communication unit 31 to the communication unit 32. In the communication unit 32, the music content data is subjected to demodulation processing or the like and the music content data subjected to the demodulation processing or the like is supplied to the amplification unit 33. The music content data is amplified by the amplification unit 33 and the amplified music content is played from the speaker 34.

When the contact operation with respect to the sensor 37 is cancelled, the sensor 37 stops the output of the operation detection signal. Subsequently, the supply of the operation detection signal with respect to the control unit 11 stops. When the supply of the operation detection signal stops, the control unit 11 turns off switch SW. After switch SW is turned off, the control signal output from the control signal generation block 100 is not supplied to the control unit 11.

Also, in a state where the contact operation is performed on the sensor 37, for example, when the stepping action is performed three times, it is possible to perform control to stop the playback of music content by similar processing to the processing described in the second embodiment.

Thus, in the portable music player 30, a control signal is formed by the power generated by the power generation unit 18 and the formed control signal is supplied to the control unit 11. That is, the operation unit 13 and the control signal generation block 100 function as a controller. Also, all control with respect to the portable music player 30 may be performed by the stepping action and a component of the operation unit 13 may be omitted. In this case, only the control signal generation block 100 functions as a controller.

Even in a case where control by motion is performed, it is possible to supply most of the power generated by the power generation unit 18 to the electricity storage unit 19 and charge the electricity storage unit 19. Therefore, the supply of the power from the electricity storage unit 19 to each unit of the portable music player 30 continues and operation of the portable music player 30 does not stop. In addition, since the control by motion is possible only when the contact operation is performed on the sensor 37, it is possible to prevent unintended processing according to the stepping action. Furthermore, since music content data is transmitted and received by radio, a cable is not necessary.

A variation example the portable music player 30 is described. Also, the variation example described below is applicable to not only the third embodiment but also other embodiments within a range in which technical contradiction is not caused. In the portable music player 30, although the power generation unit 35 and the electricity storage unit 36 are installed in the headset 30c, power used by the headset 30c may be covered by power generated by the power generation unit 18.

Figure 15:
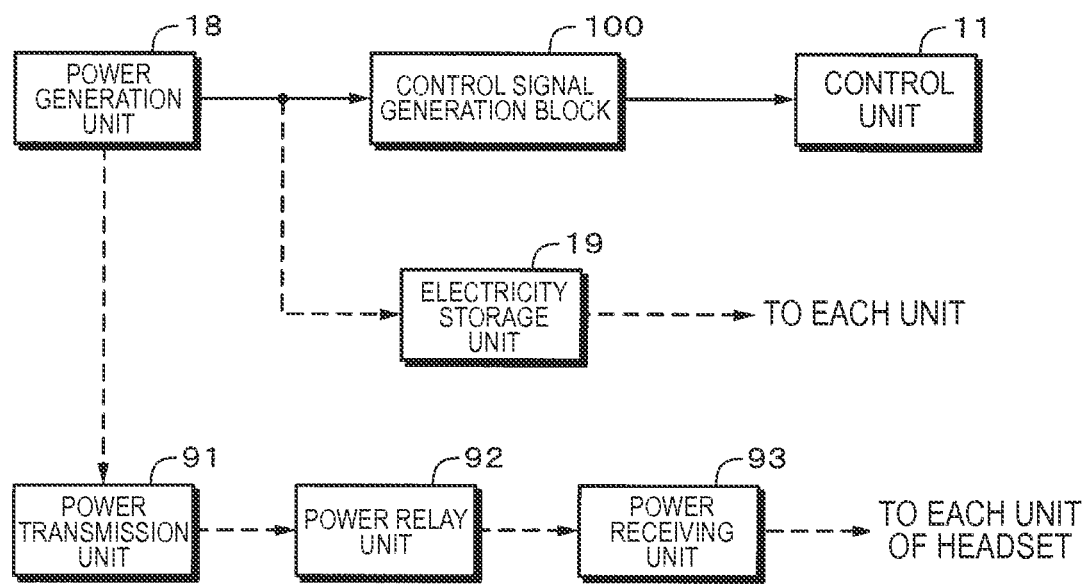
FIG. 15 is a block diagram to describe a variation example.

As illustrated in FIG. 15, for example, the power generated by the power generation unit 18 is supplied to a power transmission unit 91. The power supplied to the power transmission unit 91 is transmitted by radio to a power receiving unit 93 installed in the headset 30c through a power relay unit 92. The power transmitted by radio is received by the power receiving unit 93. The power is supplied from the power receiving unit 93 to each unit of the headset 30c. The electricity storage unit of the headset 30c may be charged by the power received by the power receiving unit 93 and the power may be supplied from the electricity storage unit to each unit of the headset 30c.

Figure 16:
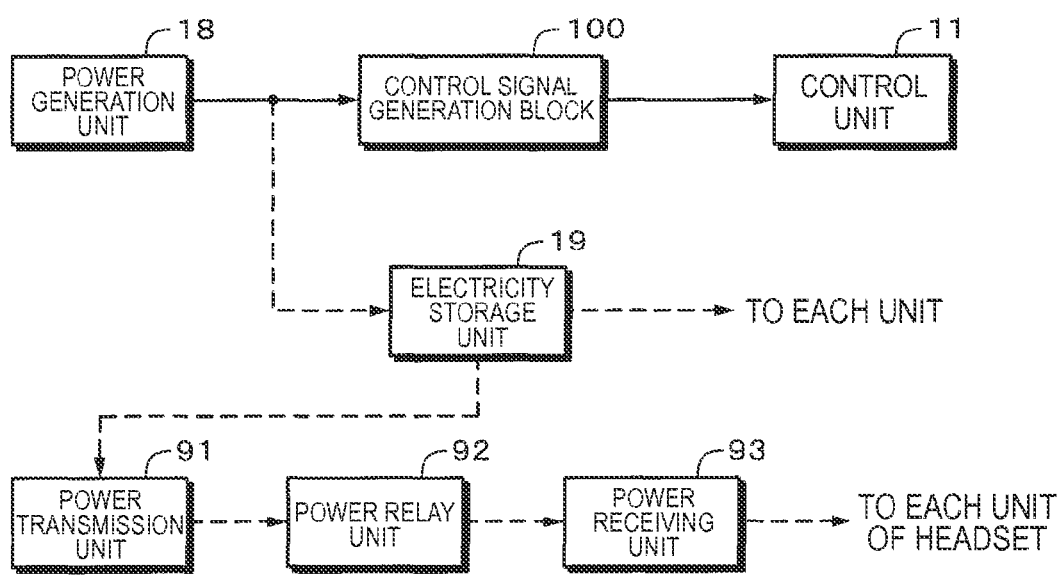
FIG. 16 is block diagram to describe another variation example.

As illustrated in FIG. 16, for example, power may be supplied from the electricity storage unit 19 to the power transmission unit 91. The power supplied to the power transmission unit 91 is transmitted by radio to the power receiving unit 93 installed in the headset 30c through the power relay unit 92. The power transmitted by radio is received by the power receiving unit 93. The power is supplied from the power receiving unit 93 to each unit of the headset 30c. The electricity storage unit of the headset 30c may be charged by the power received by the power receiving unit 93 and the power may be supplied from the electricity storage unit to each unit of the headset 30c.

The power transmission unit 91 is attached to, for example, the shoe 1a, and the power receiving unit 93 is attached to, for example, the headset 30c. The power relay unit 92 is optionally installed. The power relay unit 92 is attachable near the user's waist, for example.

For example, the power is transmitted by radio between the power transmission unit 91 and the power receiving unit 93. Examples of a wireless power transmission scheme include a radio wave scheme, an electromagnetic induction scheme and an electromagnetic field resonance scheme. In the case of the radio wave scheme, for example, the power transmission unit 91 and the power receiving unit 93 are formed in an antenna. In the case of the electromagnetic induction scheme and the electromagnetic field resonance scheme, the power relay unit 92 is installed and, for example, the power relay unit 92 and the power receiving unit 93 are formed in a coil.

Power may be transmitted between the power transmission unit 91 and the power receiving unit 93 by human body communication using a human body as a conductor. For example, the power transmitted from the power transmission unit 91 as s transmission electrode may be transmitted using the human body as the conductor and the received power may be received by the power receiving unit 93 as a reception electrode.

Thus, it is possible to supply the power generated by the power generation unit 18 to the headset 30c. Therefore, it is not necessary to install a power generation unit in the headset 30c and achieve the miniaturization and lightening of the headset 30c.

4. Fourth Embodiment

Outline of Fourth Embodiment

Figure 17:
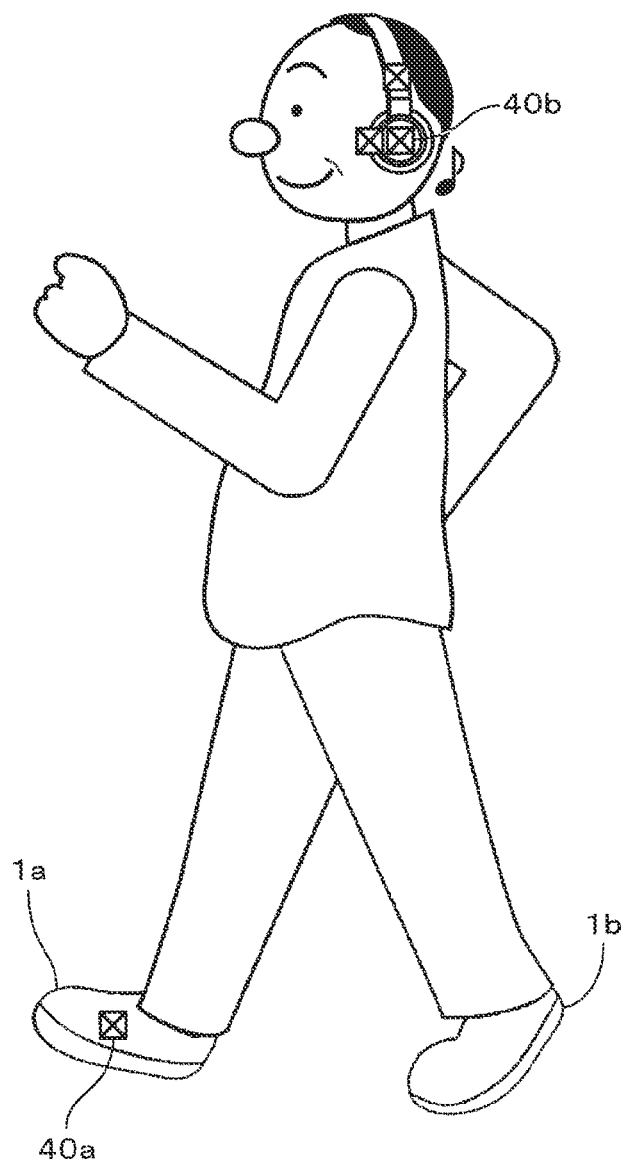
FIG. 17 is a schematic diagrammatic view illustrating the outline of the fourth embodiment.

Next, the fourth embodiment is described. FIG. 17 illustrates the outline of the fourth embodiment. In a portable music player 40 of the fourth embodiment, a power generation unit 40a and the shoe 1a are integrally formed and the other components of the portable music player 40 are formed as a headset 40b. Power generated by the power generation unit 40a is wirelessly supplied to the headset 40b.

"Configuration of Portable Music Player"

Figure 18:
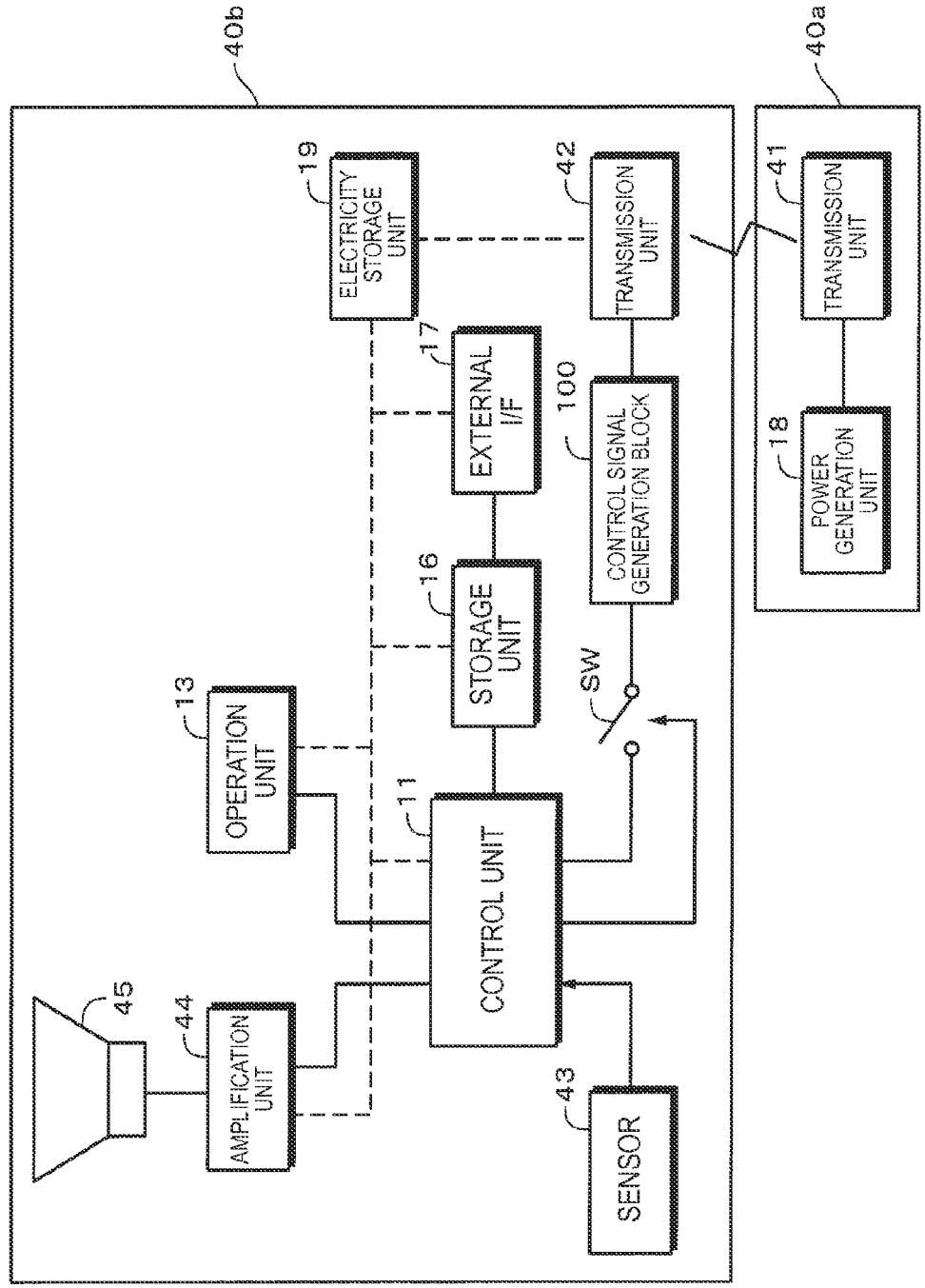
FIG. 18 is a block diagram illustrating one example of a configuration of a portable music player in the fourth embodiment.

FIG. 18 illustrates one example of a configuration the portable music player 40. In the portable music player 40, the power generation unit 18 and a transmission unit 41, which correspond to the power generation unit 40a, are attached to the shoe 1a. As described above, the power generation unit 18 generates power according to a stepping action using the shoe 1a. The power generated by the power generation unit 18 is supplied to the transmission unit 41. For example, the transmission unit 41 supplies the electrical signal generated by the power generation unit 18 to the headset 40b by radio waves.

The headset 40b includes the control unit 11, where the operation unit 13, the storage unit 16, a sensor 43 and an amplification unit 44 are connected to the control unit 11. In addition, the control signal generation block 100 is connected to the control unit 11 through switch SW. A speaker 45 is connected to the amplification unit 44 and the external I/F 17 is connected to the storage unit 16. The headset 40b includes the electricity storage unit 19, where each unit of the headset 40b operates by the power supplied from the electricity storage unit 19. In the figure, one example of a power supply line is shown by a dotted line.

In the headset 40b, the control signal generation block 100 and the electricity storage unit 19 are connected to a transmission unit 42. The transmission unit 42 receives power transmitted from the transmission unit 41. The power received by the transmission unit 42 is supplied to the electricity storage unit 19 and the electricity storage unit 19 is charged. In addition, the transmission unit 42 supplies the power transmitted from the transmission unit 41, to the control signal generation block 100. The control signal generation block 100 generates a control signal based on the power supplied from the transmission unit 42. The control signal generated by the control signal generation block 100 is supplied to the control unit 11 through switch SW.

The sensor 43 is, for example, a sensor that detects a contact operation with respect to the sensor 43. It may be a sensor that detects heat. The sensor 43 is attached to the surface of the headset 40b. When detecting the contact operation with respect to the sensor 43, the sensor 43 generates an operation detection signal. The sensor 43 supplies the generated operation detection signal to the control unit 11. The control unit 11 turns on switch SW according to the supply of the operation detection signal. When control by motion is performed on the portable music player 40, the contact operation with respect to the sensor 43 is performed.

The amplification unit 44 amplifies the music content data supplied from the control unit 11 and supplies the amplified music content data to the speaker 45. The music content is played from the speaker 45.

"Operation of Portable Music Player"

One example of operation of the portable music player 40 is described. For example, an action such as walking using the shoes 1 is performed in a state where the headset 40b is worn. The power generation unit 18 generates power according to a stepping action caused by an action such as walking. The power generated by the power generation unit 18 is transmitted by radio to the headset 40b through the transmission unit 41. The transmitted power is received by the transmission unit 42 of the headset 40b. The power received in the transmission unit 42 is supplied to the electricity storage unit 19 and the electricity storage unit 19 is charged. The power is supplied from the electricity storage unit 19 to each unit of the headset 40b.

For example, an operation using the operation unit 13 is performed on the portable music player 40. For example, when an operation to instruct the playback of music content is performed on the operation unit 13, the operation unit 13 generates a control signal to start the playback of the music content. The control signal generated by the operation unit 13 is supplied to the control unit 11. The control unit 11 reads out predetermined music content data from the storage unit 16 according to the supplied control signal. The control unit 11 performs playback processing such as decoding processing on the read music content data. The music content data subjected to the playback processing is supplied to the amplification unit 44.

The amplification unit 44 amplifies the music content data supplied from the control unit 11. The amplified music content data is supplied to the speaker 45. The music content is played from the speaker 45. Also, for example, the operation unit 13 may be formed with a remote control apparatus that can be operated at hand.

Control by motion is enabled for the portable music player 40. For example, the portable music player 40 is controlled by a stepping action. When the control by motion is performed, for example, a contact operation that touches the sensor 43 in the headset 40b is performed. When the contact operation is performed, the sensor 43 generates an operation detection signal and supplies the generated operation detection signal to the control unit 11. The control unit 11 turns on switch SW according to the supply of the operation detection signal. Subsequently, in a state where the contact operation is performed on the sensor 43, for example, the stepping action using the shoe 1a is consecutively performed twice in a predetermined time. The power generation unit 18 generates power according to this stepping action.

The generated power is transmitted from the transmission unit 41. The transmitted power is received by the transmission unit 42. The power received by the transmission unit 42 is supplied to the electricity storage unit 19 and the control signal generation block 100. Also, when the portable music player 40 is controlled by motion, the power may be supplied from the transmission unit 42 to only the control signal generation block 100.

The control signal generation block 100 includes the filter 100a, the A/D conversion unit 100b and the calculation unit 100c as described above. The power supplied from the power generation unit 18 is subjected to filter processing using the filter 100a and the signal subjected to the filter processing is converted into a digital signal by the A/D conversion unit 100b. The digital signal is supplied to the calculation unit 100c. The calculation unit 100c measures the change in the electric energy generated by the power generation unit 18 by the use of the digital signal subjected to the filter processing.

The calculation unit 100c measures the cycle number of the change in the electric energy of the power by the use of the digital signal supplied from the A/D conversion unit 100b. The calculation unit 100c detects the number of times the stepping action is performed, from the measured cycle number. For example, in a case where the calculation unit 100c measures the change in the electric energy of one cycle twice and the cycle number is two, it determines that the stepping action was performed twice.

The calculation unit 100c generates a control signal corresponding to the determined stepping action number. For example, the calculation unit 100c generates a control signal to start the playback of music content, in response to the fact that the number of stepping actions is two. The generated control signal is supplied to the control unit 11 through switch SW.

The control unit 11 performs processing based on the control signal supplied from the control signal generation block 100. For example, the control unit 11 performs processing to start the playback of the music content. That is, the control unit 11 reads out predetermined music content data from the storage unit 16 and performs playback processing on the read music content data. The control unit 11 supplies the music content data subjected to the playback processing to the amplification unit 44. The music content data is amplified by the amplification unit 44 and the amplified music content data is played through the speaker 45.

When the contact operation with respect to the sensor 43 is cancelled, the supply of the operation detection signal from the sensor 43 to the control unit 11 stops. When the supply of the operation detection signal stops, the control unit 11 turns off switch SW. After switch SW is turned off, the control signal output from the control signal generation block 100 is not supplied to the control unit 11.

Also, in a state where the contact operation is performed on the sensor 43, for example, in a case where the stepping action is performed three times, it is possible to perform control to stop the playback of the music content by similar processing to the processing described by the second embodiment. Besides this, various kinds of control can be performed on the portable music player 40 according to the number of stepping actions.

Thus, in the portable music player 40, a control signal is formed by the power generated by the power generation unit 18 and the formed control signal is supplied to the control unit 11. That is, the operation unit 13 and the control signal generation block 100 function as a controller. Also, all control with respect to the portable music player 40 may be performed by motion and a component of the operation unit 13 may be omitted. In this case, only the control signal generation block 100 functions as a controller.

Also, the power generation unit 18 and the transmission unit 41 may be detachable to the shoe 1a. For example, the power generation unit 18 and the transmission unit 41 may be detachable to an insole of the shoe 1a. By such a configuration, it is possible to generate electricity by shoes that are not limited to specific shoes and are actually used. The power generation unit may be built into shoes and worn or the power generation unit detachable to shoes may be attached to the shoes and worn. In addition, in the portable music player 40, similar to the third embodiment, music content data may be transmitted to the headset 40b.

5. Fifth Embodiment

Outline of Fifth Embodiment

Next, the fifth embodiment is described. A portable music player in the fifth embodiment is an example that includes a power generation unit and selects music content to be selected according to the power generation state of the power generation unit. A playback mode of the music content may be changed according to the power generation state of the power generation unit.

"Configuration of Portable Music Player"

Figure 19:
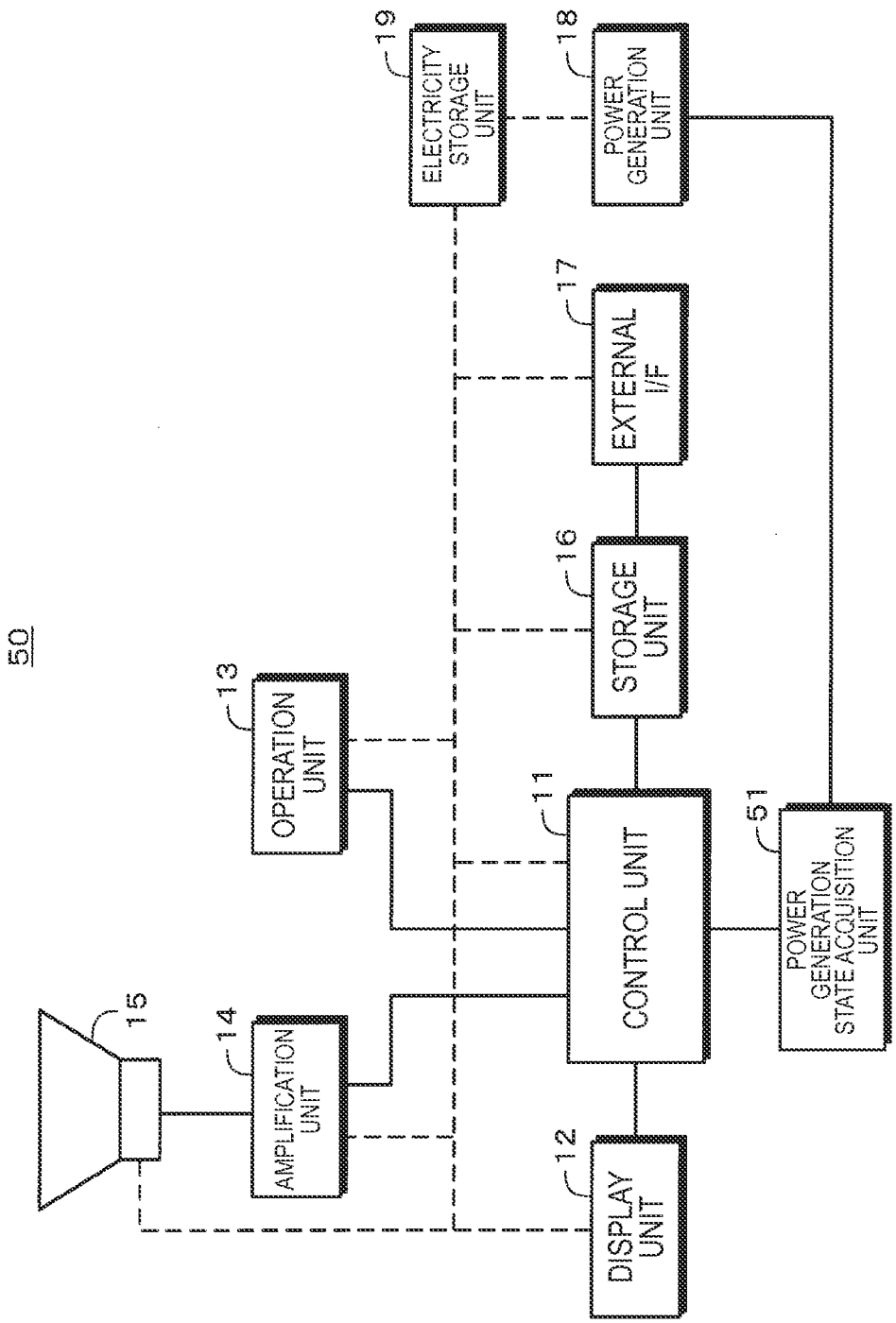
FIG. 19 is a block diagram illustrating one example of a configuration of a portable music player in the fifth embodiment.

FIG. 19 illustrates one example of a configuration of a portable music player 50 in the fifth embodiment. For example, the portable music player 50 is attached to the shoe 1a. A headset may be used in the portable music player 50 and music content may be played from the headset.

The portable music player 50 includes the control unit 11. The display unit 12, the operation unit 13, the amplification unit 14, the storage unit 16 and a power generation state acquisition unit 51 are connected to the control unit 11. The speaker 15 is connected to the amplification unit 14. The external I/F 17 is connected to the storage unit 16. The portable music player 50 includes the power generation unit 18. The power generation unit 18 generates power according to a stepping action. The power generated by the power generation unit 18 is supplied to the electricity storage unit 19 and the electricity storage unit 19 is charged. The power is supplied from the electricity storage unit 19 to each unit of the portable music player 50 and the portable music player 50 operates. In the figure, one example of a power supply line is shown by a dotted line.

For example, a plurality of items of music content data are stored in the storage unit 16. Metadata is associated with each music content data. The metadata is, for example the title, the playback time and BPM (Beats Per Minute). BPM is a unit showing how many quarter notes are averagely provided in one minute in the music content. By control in the control unit 11, it is possible to cause the display unit 12 to display content of the metadata.

The power generation state acquisition unit 51 acquires the power generation state of the power generation unit 18. For example, the power generation state acquisition unit 51 acquires time interval t between a plurality of electrical signals output by the power generation unit 18. For example, in a case where the power generation unit 18 outputs an electrical signal at a certain timing and the power generation unit 18 further outputs an electrical signal in 0.5 seconds, interval t is 0.5. The power generation state acquisition unit 51 may acquire the level of the electrical signals output from the power generation unit 18 and the output number of electrical signals output from the power generation unit 18. The average value of a plurality of intervals acquired within a predetermined time may be set as interval t.

In the power generation state acquisition unit 51, for example, processing similar to the control signal generation block 100 may be performed. For example, the power generation state acquisition unit 51 may include the filter 100a, the A/D conversion unit 100b and the calculation unit 100c. The power generation state acquisition unit 51 performs filter processing by the filter 100a on the power generated by the power generation unit 18, and, after the filter processing is performed, forms a digital signal by the A/D conversion unit 100b. The calculation unit 100c calculates the cycle number of the change in the electric energy within a predetermined time by the use of the digital signal. The number of stepping actions performed within the predetermined time may be detected from the cycle number.

The power generation state acquisition unit 51 generates a content selection signal according to interval t. The generated content selection signal is supplied to the control unit 11. The control unit 11 selects content to be played according to the content selection signal.

"Operation of Portable Music Player"

One example of operation of the portable music player 50 is described. Walking or the like using the shoes 1 is performed and a stepping action is performed according to the walking or the like. The power generation unit 18 generates power when the stepping action is performed. The generated power is supplied to the electricity storage unit 19 and the electricity storage unit 19 is charged.

The power generation state acquisition unit 51 acquires interval t of the power (electrical signals) output by the power generation unit 18. The power generation state acquisition unit 51 generates a content selection signal according to acquired interval t. The power generation state acquisition unit 51 compares thresholds Th1 and Th2 (however, Th1<Th2) and interval t, for example, and determines which of the following patterns is applied.

| | |
|---|---|
| $t < Th1$ | Pattern (1) |
| $Th1 \leq t \leq Th2$ | Pattern (2) |
| $Th2 < t$ | Pattern (3) |

Pattern (1) shows that interval t is short and electrical signals are frequently output from the power generation unit 18. That is, it shows that the stepping action is frequently performed, and the power generation state acquisition unit 51 determines that running is performed using the shoes 1.

Pattern (2) shows that interval t is a usual interval. That is, the power generation state acquisition unit 51 determines that walking at an average speed is performed using the shoes 1.

Pattern (3) shows that interval t is long. That is, the power generation state acquisition unit 51 determines that walking is performed in a relaxed manner using the shoes 1.

The power generation state acquisition unit 51 generates a content selection signal according to the determination result. In the case of determining pattern (1), the power generation state acquisition unit 51 generates a content selection signal to select music content with a fast tempo. For example, a content selection signal to select music content data with BPM of 160 or more is generated. The generated content selection signal is supplied from the power generation state acquisition unit 51 to the control unit 11.

The control unit 11 selects predetermined music content data from the music content data stored in the storage unit 16, according to the supplied content selection signal. For example, with reference to the metadata associated with each music content data, the control unit 11 reads out music content data with BPM of 160 or more from the storage unit 16. The read music content data is subjected to playback processing by the control unit 11 and the music content data subjected to the playback processing is amplified by the amplification unit 14. The amplified music content data is played from the speaker 15.

In the case of determining pattern (2), the power generation state acquisition unit 51 generates a content selection signal to select music content with a usual tempo. For example, a content selection signal to select music content data with BPM equal to or greater than 90 and less than 160 is generated. The generated content selection signal is supplied from the power generation state acquisition unit 51 to the control unit 11.

The control unit 11 selects predetermined music content data from the music content data stored in the storage unit 16, according to the supplied content selection signal. For example, with reference to the metadata associated with each music content data, the control unit 11 reads out music content data with BPM equal to or greater than 90 and less than 160 from the storage unit 16. The read music content data is subjected to playback processing by the control unit 11 and the music content data subjected to the playback processing is amplified by the amplification unit 14. The amplified music content data is played from the speaker 15.

In the case of determining pattern (3), the power generation state acquisition unit 51 generates a content selection signal to select music content with a slow tempo. For example, a content selection signal to select music content data with BPM less than 90 is generated. The generated content selection signal is supplied from the power generation state acquisition unit 51 to the control unit 11.

The control unit 11 selects predetermined music content data from the music content data stored in the storage unit 16, according to the supplied content selection signal. For example, with reference to the metadata associated with each music content data, the control unit 11 reads out music content data with BPM less than 90 from the storage unit 16. The read music content data is subjected to playback processing by the control unit 11 and the music content data subjected to the playback processing is amplified by the amplification unit 14. The amplified music content data is played from the speaker 15.

Thus, a state such as walking is determined according to the electrical signal (power) output from the power generation unit 18 and music content corresponding to the determination result is played. For example, music content with a slow tempo is played at the time of slow walking, music content with a normal tempo is played at the time of walking at a usual speed, music content with a fast tempo can be played at the time of running and music content with a tempo suitable for the speed of walking or the like can be played. In addition, since the speed of walking or the like can be determined according to the power generated by the power generation unit 18, it is not necessary to install a sensor or the like to measure the speed of walking or the like.

Also, the control unit 11 may have the above-mentioned function of the power generation state acquisition unit 51. That is, the control unit 11 may acquire the power generation state of the power generation unit 18 and select music content data according to the power generation state. A signal indicating interval t may be supplied from the power generation state acquisition unit 51 to the control unit 11 and subjected to processing to determine the above-mentioned pattern by the control unit 11.

Processing to change the playback mode of currently-played music content may be performed by the control unit 11 according to the power generation state. For example, the control unit 11 has a tempo control function to change the tempo of music content data. As processing to change the tempo, it is possible to apply known processing. In the case of pattern (1), processing to speed up the tempo of the currently-played music content may be performed, and, in the case of pattern (3), processing to slow the tempo of the currently-played music content may be performed by the control unit 11. In the case of pattern (2), the tempo of the music content is not changed. The speed of walking or the like is determined from the power generation state and it is possible to play the music content at a tempo suitable for the speed of walking or the like.

Content of metadata used at the time of selecting music content data is not limited to BPM. For example, the use category including "for stroll," "for walking" and "for exercise" as metadata is associated with each music content data. In a case where pattern (1) is determined from the power generation state, music content data associated with metadata for exercise may be played, in a case where pattern (2) is determined, music content data associated with metadata for walking may be played, and, in a case where pattern (3) is determined, music content data associated with metadata for stroll may be played.

The number of thresholds is not limited to 2. For example, it may be possible to use five thresholds, analyze the power generation state in more detail and select music content data according to the analysis result. In addition, music content data suitable for the speed of walking or the like may be automatically generated by the control unit 11.

In a case where it is possible to determine the number of stepping actions performed within a predetermined time by the power generation state acquisition unit 51, music content to be played may be selected according to the determined stepping action number. The playback mode of the music content may be changed according to the number of stepping actions. For example, the predetermined time is assumed to be ten seconds, and, in a case where it is determined that the stepping action was performed twenty times or more in ten seconds, music content data with a fast tempo is selected as well as pattern (1). In a case where it is determined that the stepping action was performed seven times or more and less than twenty times in ten seconds, music content data with a normal tempo is selected as well as pattern (2). In a case where it is determined that the stepping action was performed seven times or less than twenty times in ten seconds, music content data with a slow tempo is selected as well as pattern (3).

6. Sixth Embodiment

Outline of Sixth Embodiment

Next, the sixth embodiment is described. In the sixth embodiment, music content to be played is selected according to the power generation state and control by motion is enabled for a portable music player.

"Configuration and Operation of Portable Music Player"

Figure 20:
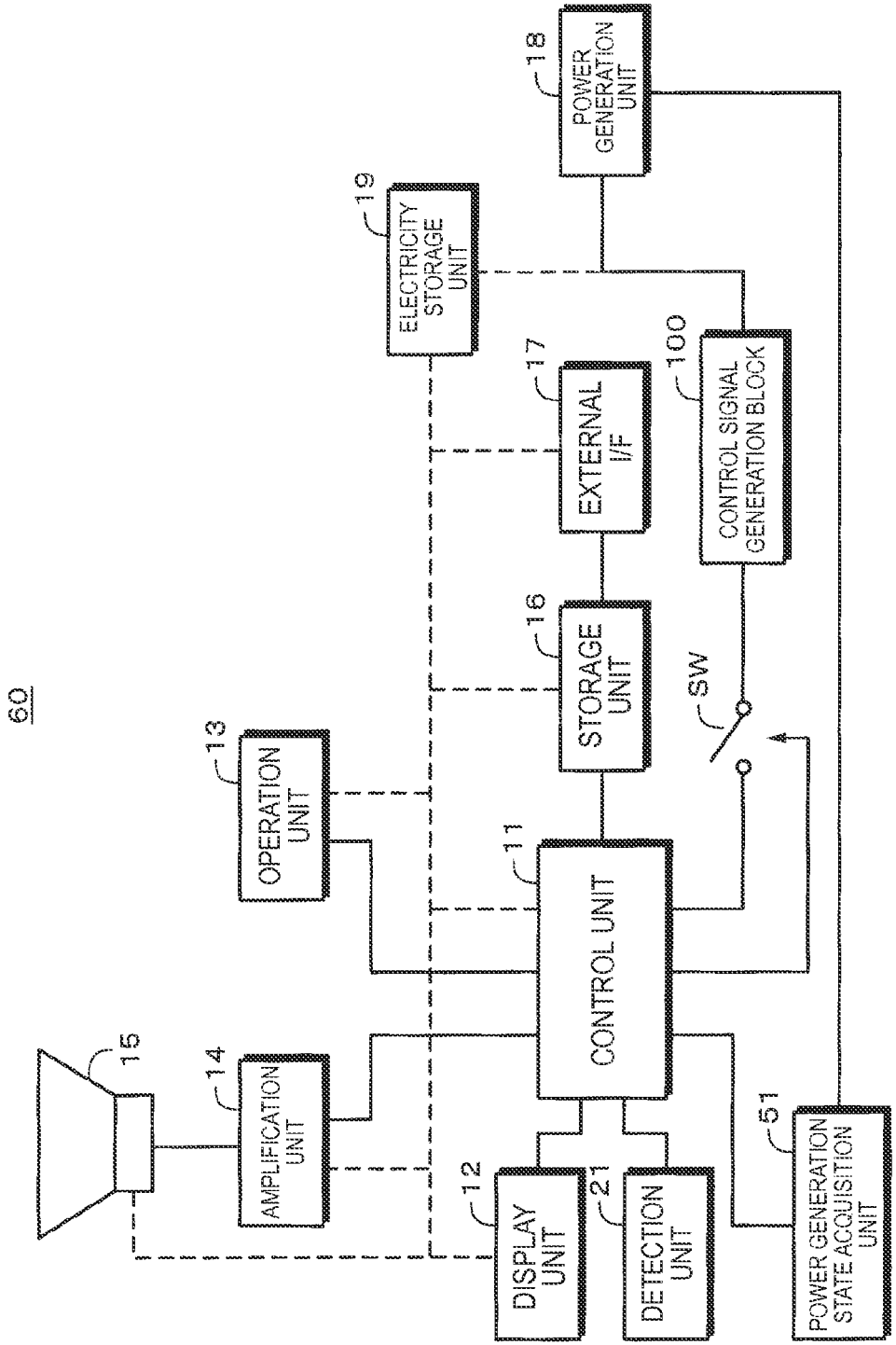
FIG. 20 is a block diagram illustrating one example of a configuration of a portable music player in the sixth embodiment.

FIG. 20 illustrates one example of a configuration of a portable music player 60 in the sixth embodiment. The portable music player 60 is formed by adding the detection unit 21, the control signal generation block 100 and switch SW to the configuration of the portable music player 50. The detection unit 21 is connected to the control unit 11. The control signal generation block 100 is connected to the power generation unit 18. The control signal generation block 100 is further connected to the control unit 11 through switch SW. In the figure, one example of a power supply line is shown by a dotted line.

Control by motion is enabled for the portable music player 60. For example, it is possible to control the portable music player 60 by a stepping action. Since the processing to perform control by the stepping action is similar to the portable music player 20 in the second embodiment, schematic explanation is given.

The stepping action using the shoe 1a is performed while the detection unit 21 is pressed, for example. Switch SW is turned on by the control unit 11 when the detection unit 21 is pressed. The control signal generation block 100 generates a control signal according to a signal generated by the power generation unit 18 in response to the stepping action. For example, the number of stepping actions is determined by the control signal generation block 100 and a control signal corresponding to the number of stepping actions is generated. The generated control signal is supplied from the control signal generation block 100 to the control unit 11 through switch SW. The control unit 11 performs processing according to the supplied control signal.

In addition, in the portable music player 60, it is possible to determine the speed of walking or the like according to the power generation state and play music content with a tempo suitable for the speed of walking or the like. The processing content is similar to the above-mentioned fifth embodiment and overlapping explanation is omitted.

The portable music player 60 can be used as follows, for example. The stepping action is performed twice while operating the detection unit 21 at the time of the start of walking or the like, and the playback of music content is started. Subsequently, an operation with respect to the detection unit 21 is cancelled, and, for example, running starts. Music content with a tempo suitable for the running speed is played from the speaker 15. The music content may be played using a headset. The usage example of the portable music player 60 is not limited to the above-mentioned usage example.

In addition, switch SW and the power generation state acquisition unit 51 may be omitted. For example, when the detection unit 21 is operated, the control signal generation block 100 generates the control signal by the above-mentioned processing. The generated control signal is supplied to the control unit 11. When the detection unit 21 is not operated, the control signal generation block 100 determines the number of stepping actions within a predetermined time. The determined stepping action number is supplied to the control unit 11. The control unit 11 selects music content or changes a playback mode of the music content according to the supplied stepping action number. Thus, the control signal generation block 100 may have the function of the power generation state acquisition unit 51. The function of the control signal generation block 100 may be switched by the control unit 11.

7. Seventh Embodiment

Outline of Seventh Embodiment

Next, the seventh embodiment is described. The seventh embodiment is an example of changing a playback mode of music content according to the remaining capacity of an electricity storage unit.

"Configuration of Portable Music Player"

Figure 21:
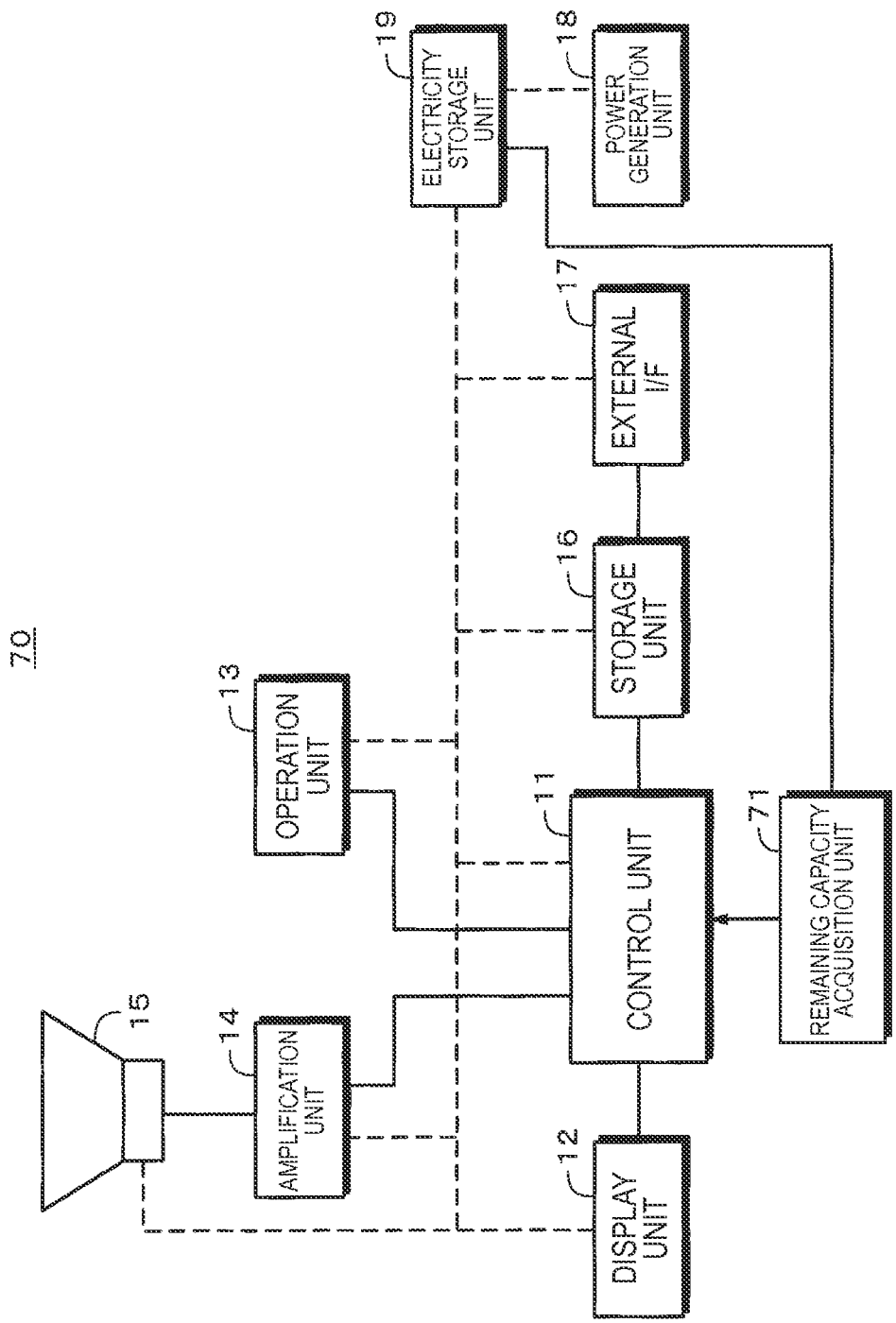
FIG. 21 is a block diagram illustrating one example of a configuration of a portable music player in the seventh embodiment.

FIG. 21 illustrates one example of a configuration of a portable music player 70. For example, the portable music player 70 is attached to the shoe 1a. A headset may be used in the portable music player 70 and music content may be played from the headset.

The portable music player 70 includes the control unit 11. The control unit 11 has a tempo control function to change the tempo of currently-played music content data. The display unit 12, the operation unit 13, the amplification unit 14, the storage unit 16 and a remaining capacity acquisition unit 71 are connected to the control unit 11. The speaker 15 is connected to the amplification unit 14. The external I/F 17 is connected to the storage unit 16.

The portable music player 70 includes the power generation unit 18. The power generation unit 18 generates power according to a stepping action. The power generated by the power generation unit 18 is supplied to the electricity storage unit 19 and the electricity storage unit 19 is charged. The power is supplied from the electricity storage unit 19 to each unit of the portable music player 70 and the portable music player 70 operates. In the figure, one example of a power supply line is shown by a dotted line.

For example, a plurality of items of music content data are stored in the storage unit 16. Metadata is associated with each music content data. The metadata is, for example, the title, the playback time and BPM. It is possible to cause the display unit 12 to display the content of the metadata by control in the control unit 11.

The remaining capacity acquisition unit 71 is connected to the control unit 11. The remaining capacity acquisition unit 71 is connected to the electricity storage unit 19 and acquires the remaining capacity of the electricity storage unit 19. For example, in a case where the electricity storage unit 19 is a lithium-ion secondary battery, the remaining capacity acquisition unit 71 acquires the remaining capacity by measuring the voltage between terminals of the lithium-ion secondary battery. The remaining capacity acquisition unit 71 supplies a remaining capacity signal indicating the remaining capacity of the electricity storage unit 19 to the control unit 11. The remaining capacity signal may be supplied to the control unit 11 when the remaining capacity of the electricity storage unit 19 decreases to a predetermined value or less, for example, 30% or less of the full charge.

The control unit 11 performs processing according to the supplied remaining capacity signal. When the remaining capacity indicated by the remaining capacity signal decreases to 30% or less, for example, the control unit 11 performs processing that speeds up the tempo of the currently-played music content. The music content data subjected to tempo control by the control unit 11 is amplified by the amplification unit 14 and the amplified music content data is supplied to the speaker 15. Also, as a method of the tempo control that speeds up the tempo, it is possible to apply a known method.

"Operation of Portable Music Player"

One example of operation of the portable music player 70 is described. The portable music player 70 is used and music content data read from the storage unit 16 by the control unit 11 is played from the speaker 15. The remaining capacity acquisition unit 71 generates a remaining capacity signal and supplies the generated remaining capacity signal to the control unit 11.

The control unit 11 performs processing according to the supplied remaining capacity signal. In a case where the remaining capacity indicated by the remaining capacity signal decreases to 30% or less, for example, the control unit 11 performs processing that speeds up the tempo of the currently-played music content. The music content data subjected to tempo control by the control unit 11 is amplified by the amplification unit 14 and the amplified music content data is supplied to the speaker 15.

In general, when walking or the like is performed while listening to music content, it is known that the speed of walking or the like follows the tempo of the music content. Therefore, the speed of walking or the like becomes fast when the tempo of the currently-played music content becomes fast. When the speed of walking or the like becomes fast, the number of stepping actions using the shoe 1a increases. When the number of stepping actions increases, power generated by the power generation unit 18 increases. That is, the power generated by the power generation unit 18 increases and the electric energy supplied to the electricity storage unit 19 increases. Therefore, it is possible to quickly charge the electricity storage unit 19 in which the remaining capacity decreases.

Also, processing performed by the control unit 11 according to the remaining capacity signal is not limited to processing that speeds up the tempo of music content data. The control unit 11 may stop part of processing according to the remaining capacity signal. For example, in a case where the remaining capacity indicated by the remaining capacity signal decreases to 30% or less, the control unit 11 may not perform processing using an equalizer. By stopping part of the processing performed by the control unit 11, it is possible to reduce the power consumed by the control unit 11 and prevent the remaining capacity of the electricity storage unit 19 from decreasing. Music content data subjected to playback processing in which processing by the equalizer is omitted is played from the speaker 15. The control unit 11 may perform processing that decreases the level of the music content data according to the remaining capacity signal.

In a case where the remaining capacity indicated by the remaining capacity signal decreases to 30% or less, for example, the processing of the equalizer may be stopped, and, furthermore, in a case where the remaining capacity decreases to 10% or less, processing that speeds up the tempo of the music content may be performed.

Also, the control unit 11 may have the function of the remaining capacity acquisition unit 71. The control unit 11 may acquire the remaining capacity of the electricity storage unit 19 and change a playback mode of content according to the remaining capacity.

8. Eighth Embodiment

Outline of Eighth Embodiment

Next, the eighth embodiment is described. The eighth embodiment is an example of changing a playback mode of music content according to the remaining capacity of the electricity storage unit and forming a control signal by power generated by the power generation unit 18.

"Configuration and Operation of Portable Music Player"

FIG. 22 illustrates one example of a configuration of a portable music player 80. The portable music player 80 is formed by adding the detection unit 21, the control signal generation block 100 and switch SW to the configuration of the portable music player 70. The detection unit 21 is connected to the control unit 11. The control signal generation block 100 is connected to the control unit 11 through switch SW. The control signal generation block 100 is connected to the power generation unit 18 and forms a control signal by the power generated by the power generation unit 18. In the figure, one example of a power supply line is shown by a dotted line.

For example, it is possible to perform control by motion on the portable music player 80. For example, since the processing content of the control by motion is similar to the processing in the portable music player 20 in the second embodiment, schematic explanation is given.

A stepping action using the shoe 1a is performed while the detection unit 21 is pressed, for example. By pressing the detection unit 21, switch SW is turned on by the control unit 11. The power generation unit 18 generates power according to the stepping action. The generated power is supplied to the control signal generation block 100. The control signal generation block 100 generates a control signal from the supplied power. For example, the number of stepping actions is determined by the control signal generation block 100 and a control signal corresponding to the number of stepping actions is generated. The generated control signal is supplied from the control signal generation block 100 to the control unit 11 through switch SW. The control unit 11 performs processing according to the supplied control signal.

In the portable music player 80, processing that changes a playback mode of music content according to the remaining capacity of the electricity storage unit 19 is performed. For example, when the remaining capacity of the electricity storage unit 19 decreases, processing that speeds up the tempo of the music content is performed by the control unit 11. Since the processing content is processing similar to the above-mentioned portable music player 70, overlapping explanation is omitted.

A headset may be installed in portable music player 80 and music content may be played from the headset. The operation detection signal may be generated by the sensor 37 installed in the headset instead of the detection unit 21.

9. Variation Example

Although the plurality of embodiments of the present disclosure have been specifically described above, the present disclosure is not limited to these embodiments. Although an example has been described in the above-mentioned embodiments where music content is one example, it is possible to apply the present disclosure to other image content or the like.

The present disclosure is not limited to a portable music player. For example, the present disclosure is applicable to mobile phones and smart phones. For example, a power generation unit that generates electricity by vibration may be installed in a smart phone that has a display unit. At the time of normal use, the power generation unit generates electricity when the smart phone is shaken, and an electricity storage unit is charged. Subsequently, for example, when the smart phone is shaken in a state where a predetermined part of the display unit is touched, the power generation unit may generate electricity and a control signal corresponding to the shaken number may be generated. For example, a menu screen may be changed according to the control signal. In addition, the present disclosure is applicable to a digital still camera. An imager of the digital still camera may be operated by the power generated by the power generation unit.

The motion in the present disclosure is not limited to the stepping action and the power generation unit may generate electricity by other actions than the stepping action. For example, the power generation unit may generate electricity by transformation like piezoelectric elements. Subsequently, for example, the power generation unit may be attachable to a user's elbow and the power generation unit may be transformed by a flexing action of the elbow and generate electricity. The power generation unit may generate electricity according to a gesture to shake an arm, and a control signal may be formed with a signal generated by the power generation unit.

The power generation unit may be configured to generate electricity by thermoelectric conversion, and the power generation unit may be attachable to the head. The power generation unit may be configured to generate electricity by thermoelectric conversion and displacement, and the power generation unit may be attachable to the neck. The power generation unit may be configured to generate electricity by electromagnetic induction, and the power generation unit may be attachable to the lower back. The power generation unit may be configured to generate electricity by inverse-magnetostriction, and the power generation unit may be attachable to a thigh. The power generation scheme of the power generation unit and the position to which the power generation unit is attached can be adequately changed.

All compositions such as the power generation unit and the control unit may be installed in the headset. As a power generation scheme of the power generation unit in the headset, it is possible to adopt a scheme of photovoltaic power generation, a scheme combining the photovoltaic power generation and thermoelectric generation, and a scheme combining the photovoltaic power generations and vibration power generation, and so on.

The control content corresponding to motion can be adequately changed. For example, control that increases the volume level of music content in response to one stepping action may be performed. Control that decreases the volume level of the music content in response to two stepping actions may be performed. The above-mentioned portable music player may be incorporated in not only shoes but also clothes.

The configurations and the processing content or the like in the above-mentioned plurality of embodiments and the variation examples can be mutually applied within a range in which technical contradiction is not caused. In the present disclosure, compositions that are not essential can be adequately omitted. In addition, all or part of the configurations and processing of the present disclosure can be formed as a method, a program and a recording medium that records the program, besides a device.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention. Additionally, the present disclosure may also be configured as below.

(1)

A portable electronic device including:

a signal processing unit;

a controller that supplies a control signal to the signal processing unit; and a power generation unit that generates an electrical signal as power and supplies the generated electrical signal to the signal processing unit.

(2)

The portable electronic device according to (1), wherein the control signal is formed by the electrical signal generated by the power generation unit.

(3)

The portable electronic device according to (1) or (2), wherein the power generation unit generates the electrical signal according to a stepping action including an action to put a foot and an action to lift the foot.

(4)

The portable electronic device according to any one of (1) to (3), wherein at least the power generation unit is attached to a shoe.

(5)

The portable electronic device according to any one of (1) to (4), wherein the signal processing unit performs processing to play content, and selects the content that is played, according to a power generation state of the power generation unit.

(6)

The portable electronic device according to any one of (1) to (4), wherein the signal processing unit performs processing to play content, and changes a playback mode of the content according to a power generation state of the power generation unit.

(7)

A portable electronic device including:

a signal processing unit that performs processing to play content; and a power generation unit that generates an electrical signal as power and supplies the electrical signal to an electricity storage unit, wherein the signal processing unit changes a playback mode of the content according to a remaining capacity of the electricity storage unit.

(8)

The portable electronic device according to (7), wherein a control signal to the signal processing unit is formed by the electrical signal generated by the power generation unit.

(9)

A signal processing method in a portable electronic device including a signal processing unit, a controller and a power generation unit, the signal processing method including:

supplying a control signal to the signal processing unit, the control signal being output from the controller; and supplying an electrical signal generated by the power generation unit as power to the signal processing unit.

(10)

A playback method including:

playing content by a signal processing unit;

generating an electrical signal as power by a power generation unit and supplying the electrical signal to an electricity storage unit; and changing a playback mode of the content according to a remaining capacity of the electricity storage unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 10, 20, 30, 40, 50, 60, 70, 80 Portable music player
11 Control unit
13 Operation unit
18 Power generation unit
19 Electricity storage unit
51 Power generation state acquisition unit
71 Remaining capacity acquisition unit
100 Control signal generation block

The invention claimed is:
1. A portable electronic device comprising:
a signal processing unit;
an electricity storage unit;
a controller configured to supply a control signal to the signal processing unit;
a power generation unit configured to generate an electrical signal according to a first action, the first action includes a stepping action; and
an operation unit configured to operate the portable electronic device according to a second action, the second action includes an input to the operation unit by a user,
wherein when the second action and the first action both performs, the power generation unit generates and supplies the electrical signal to the controller, and
wherein when the second action does not perform and the first action performs, the power generation unit generates and supplies the electrical signal as electrical power only to the electricity storage unit.

2. The portable electronic device according to claim 1, wherein the control signal is formed by the electrical signal generated by the power generation unit.

3. The portable electronic device according to claim 1, wherein the stepping action including an action to put a foot and an action to lift the foot.

4. The portable electronic device according to claim 1, wherein at least the power generation unit is attached to a shoe.

5. The portable electronic device according to claim 1, wherein the signal processing unit is configured to perform processing to play content, and select the content that is played, according to a power generation state of the power generation unit.

6. The portable electronic device according to claim 1, wherein the signal processing unit is configured to perform processing to play content, and change a playback mode of the content according to a power generation state of the power generation unit.

7. The portable electronic device according to claim 1, wherein the control unit supplies the control signal to the signal processing unit for performing processing to speed up a tempo of a content when a remaining capacity of a electricity storage unit is equal to or less than 30%.

8. The portable electronic device according to claim 1, wherein the control unit is configured to speed up a play tempo of a content when an interval time of the electric signal output from the power generation unit is less than a predetermined threshold.

9. The portable electronic device according to claim 1, wherein the power generation unit includes an electret rotor, and the electret rotor has a disk-shaped surface including a first portion and a second portion, and wherein the first portion includes a half circular shape electret film and the second portion does not include an electret film.

10. The portable electronic device according to claim 1, wherein the signal processing unit is configured to play a content with fast tempo if a stepping action of the shoe is faster than a predetermined speed.

11. The portable electronic device according to claim 10, wherein a control signal to the signal processing unit is formed by the electrical signal generated by the power generation unit.

12. The portable electronic device according to claim 10, wherein the signal processing unit performs processing to speed up a tempo of the content when a remaining capacity of the electricity storage unit is equal to or less than 30%.

13. The portable electronic device according to claim 10, wherein the signal processing unit performs processing to speed up the play tempo of the content when an interval time of the electric signal output from the power generation unit is less than a predetermined threshold.

14. A signal processing method in a portable electronic device including a signal processing unit, an electricity storage unit, a controller, an operation unit and a power generation unit, the signal processing method comprising:
generating an electrical signal by the power generation unit according to a first action, the first action includes a stepping action;
supplying a control signal to the signal processing unit, the control signal being output from the controller;
supplying the electrical signal generated by the power generation unit to the signal processing unit;
generating and supplying, by the power generation unit, the electrical signal to the controller when a second action including an input to the operation unit by a user and the first action both performs, and
generating and supplying, by the power generation unit, the electrical signal as electrical power only to the electricity storage unit when the second action does not perform and the first action performs.

* * * * *